United States Patent
Bullock

(10) Patent No.: US 9,637,044 B2
(45) Date of Patent: *May 2, 2017

(54) SECURING CARGO FOR RAIL TRANSPORT USING POLYMER FOAM MATERIAL

(71) Applicant: Matthew Bullock, McLean, VA (US)

(72) Inventor: Matthew Bullock, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/148,192

(22) Filed: May 6, 2016

(65) Prior Publication Data

US 2016/0250962 A1 Sep. 1, 2016

Related U.S. Application Data

(63) Continuation of application No. 14/663,531, filed on Mar. 20, 2015, now Pat. No. 9,333,899.

(60) Provisional application No. 62/102,158, filed on Jan. 12, 2015, provisional application No. 62/095,981, filed on Dec. 23, 2014.

(51) Int. Cl.
| | |
|---|---|
| B60P 7/08 | (2006.01) |
| B60P 7/14 | (2006.01) |
| B60P 7/16 | (2006.01) |
| B61D 45/00 | (2006.01) |
| B60P 7/135 | (2006.01) |

(52) U.S. Cl.
CPC .............. *B60P 7/14* (2013.01); *B60P 7/135* (2013.01); *B60P 7/16* (2013.01); *B61D 45/00* (2013.01)

(58) Field of Classification Search
CPC ............. B60P 7/14; B60P 7/16; B61D 45/00

USPC ... 410/87, 88, 118, 121, 129, 117, 154, 155; 206/523, 524, 591, 593; 248/354.1
See application file for complete search history.

(56) References Cited

U.S. PATENT DOCUMENTS

| | | | |
|---|---|---|---|
| 2,674,206 | A | 4/1954 | Scott |
| 3,072,270 | A | 1/1963 | Tolby et al. |
| 3,199,689 | A | 8/1965 | Feldkamp |
| 3,314,379 | A | 4/1967 | Krokos |
| 3,336,069 | A | 8/1967 | Bayer et al. |
| 3,421,451 | A | 1/1969 | Brucks |
| 3,424,108 | A | 1/1969 | Vargen |
| 3,462,027 | A | 8/1969 | Puckhaber |
| 3,581,674 | A | 6/1971 | O'Leary |
| 3,767,066 | A | 10/1973 | Martin et al. |
| 3,872,799 | A | 3/1975 | Dousset |
| 3,985,242 | A | 10/1976 | Schlaeger |
| 4,247,237 | A | 1/1981 | Brown |
| 4,264,251 | A | 4/1981 | Blatt |
| 4,300,864 | A | 11/1981 | Liebel et al. |
| 4,566,831 | A | 1/1986 | Groth |
| 4,854,792 | A | 8/1989 | Cottone |

(Continued)

FOREIGN PATENT DOCUMENTS

DE  34 22 041 A1  12/1985

*Primary Examiner* — Stephen Gordon
(74) *Attorney, Agent, or Firm* — Banner & Witcoff, Ltd.

(57) ABSTRACT

A cargo restraint panel may include a foam component. That foam component may have at least one polymer foam sheet. A front face fibrous reinforcing material may be bonded to and substantially cover a front face of the foam component. A rear face fibrous reinforcing material may be bonded to and substantially cover a rear face of the foam component. The cargo restraint panel may include one or more edge guards. Cargo may be secured in a railcar or other conveyance by, e.g., placing cargo restraint panels between cargo units.

22 Claims, 18 Drawing Sheets

(56) References Cited

U.S. PATENT DOCUMENTS

| | | |
|---|---|---|
| 5,132,156 A | 7/1992 | Trassare, Jr. et al. |
| 5,678,968 A | 10/1997 | Bourgeois et al. |
| 5,741,098 A | 4/1998 | Letts, III |
| 5,855,459 A | 1/1999 | Krier et al. |
| 6,089,802 A | 7/2000 | Bullock |
| 6,227,779 B1 | 5/2001 | Bullock |
| 6,527,488 B2 | 3/2003 | Elze et al. |
| 6,607,337 B1 | 8/2003 | Bullock |
| 6,896,459 B1 | 5/2005 | Bullock |
| 6,923,609 B2 | 8/2005 | Bullock |
| 6,981,827 B2 | 1/2006 | Bullock |
| 7,018,151 B2 | 3/2006 | Bullock |
| 7,066,698 B2 | 6/2006 | Bullock |
| 7,137,765 B1 | 11/2006 | Elze et al. |
| 7,290,969 B2 | 11/2007 | Bullock |
| 7,322,781 B2 | 1/2008 | Bullock |
| 7,329,074 B2 | 2/2008 | Bullock |
| 7,604,443 B2 | 10/2009 | Bullock |
| 7,708,508 B2 | 5/2010 | Bullock |
| 7,726,920 B2 | 6/2010 | Bullock |
| 7,789,604 B2 | 9/2010 | Rotche |
| 7,798,754 B2 | 9/2010 | Funk et al. |
| 8,113,752 B2 | 2/2012 | Bullock |
| 8,128,324 B2 | 3/2012 | Bullock |
| 8,128,327 B2 | 3/2012 | Jevaney |
| 8,308,411 B2 | 11/2012 | Funk et al. |
| 8,398,343 B1 | 3/2013 | Henley et al. |
| 8,398,344 B2 | 3/2013 | Bullock |
| 8,403,607 B1 | 3/2013 | Bullock |
| 8,403,608 B1 | 3/2013 | Bullock |
| 8,403,609 B1 | 3/2013 | Bullock |
| 8,408,852 B1 | 4/2013 | Bullock |
| 8,419,329 B1 | 4/2013 | Bullock |
| 8,727,682 B2 | 5/2014 | Johnson et al. |
| 8,888,424 B1 | 11/2014 | Bullock |
| 8,979,449 B2 | 3/2015 | Bullock |
| 9,090,194 B1 | 7/2015 | Bullock |
| 9,333,899 B1 * | 5/2016 | Bullock .................... B60P 7/16 410/118 |
| 2003/0206782 A1 | 11/2003 | Toglia |
| 2008/0047210 A1 | 2/2008 | Bell |
| 2011/0033258 A1 | 2/2011 | Unander |
| 2012/0099941 A1 | 4/2012 | Larsh et al. |
| 2014/0105703 A1 | 4/2014 | Kvilhaug et al. |
| 2014/0271022 A1 | 9/2014 | Ridgeway |

\* cited by examiner

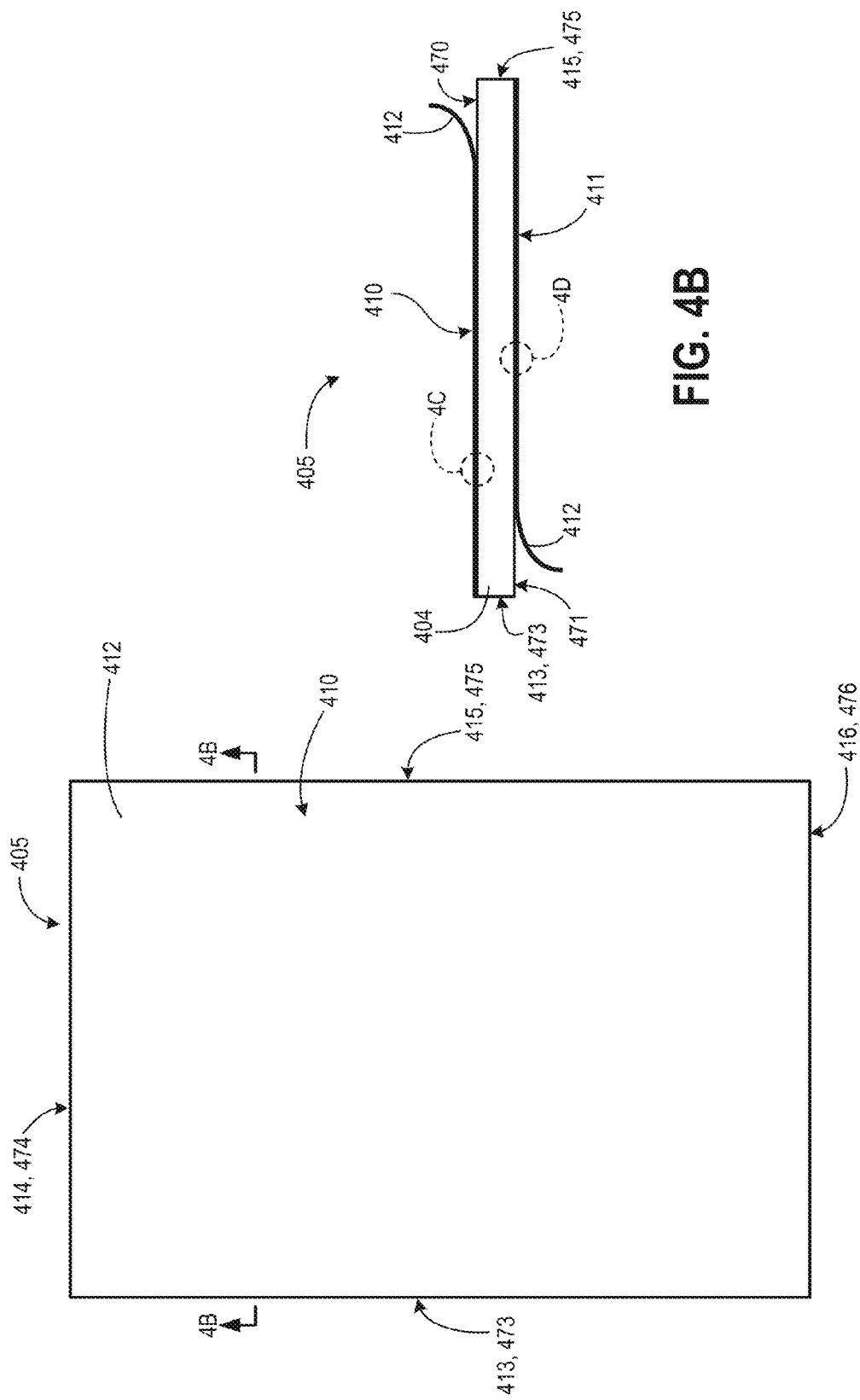

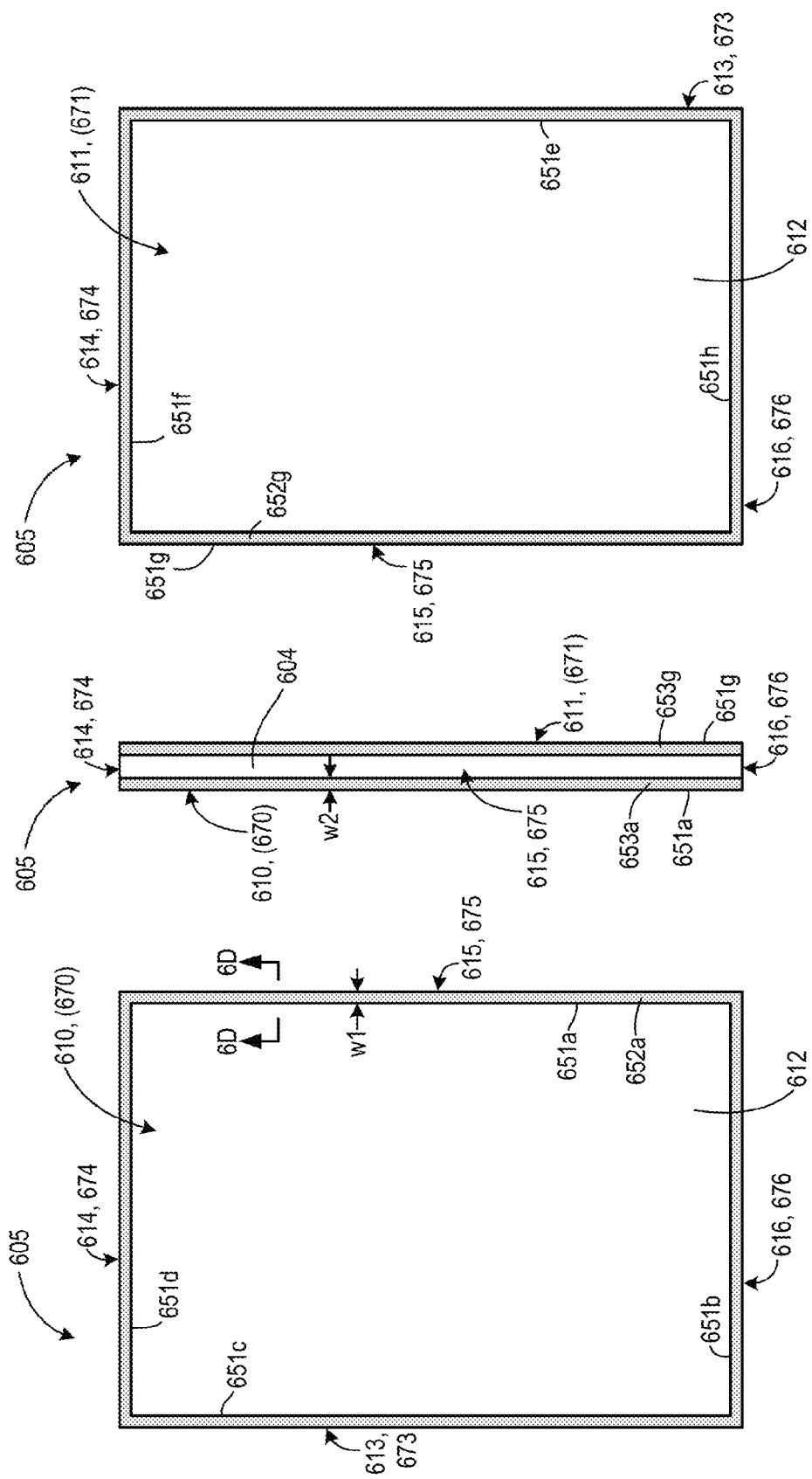

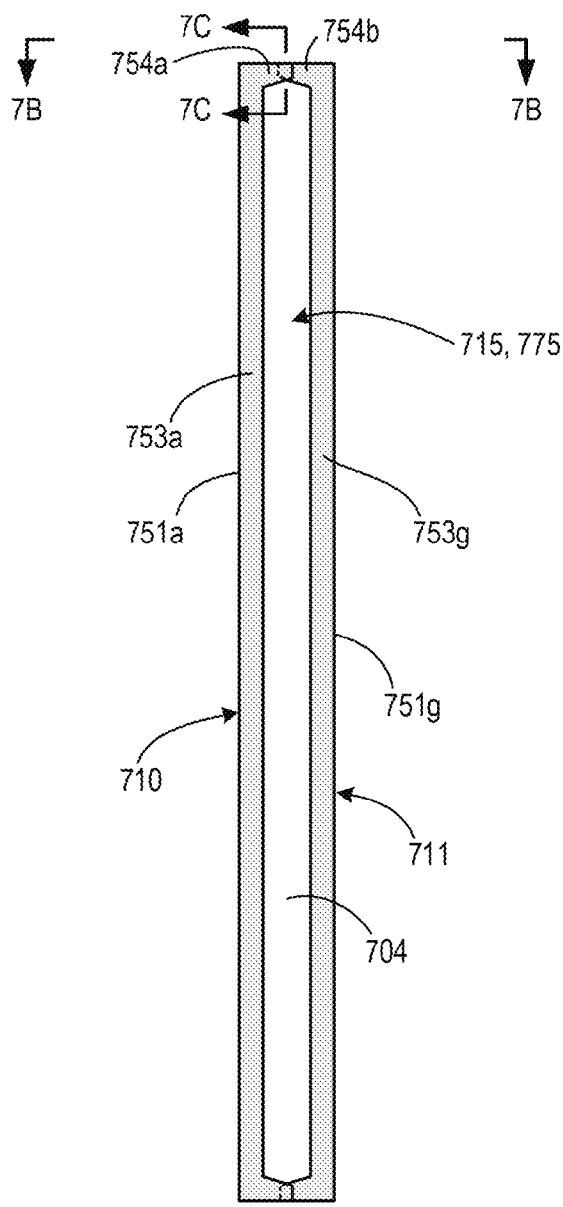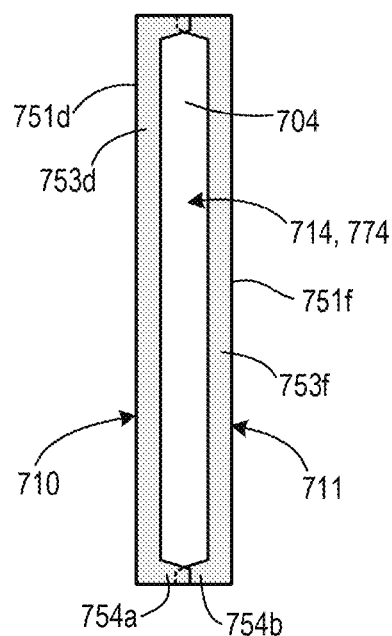
FIG. 7A
FIG. 7B

SECURING CARGO FOR RAIL TRANSPORT USING POLYMER FOAM MATERIAL

CROSS-REFERENCE TO RELATED APPLICATIONS

This application is a continuation of U.S. patent application Ser. No. 14/663,531, titled "Securing Cargo for Rail Transport Using Polymer Foam Material" and filed Mar. 20, 2015, now U.S. Pat. No. 9,333,899, which application claims priority to U.S. provisional patent application no. 62/102,158, titled "Securing Cargo for Rail Transport Using Polymer Foam Material" and filed Jan. 12, 2015, and to U.S. provisional patent application no. 62/095,981, titled "Securing Cargo for Rail Transport Using Polymer Foam Material," and filed Dec. 23, 2014. Application no. 14/663,531, application no. 62/102,158, and application no. 62/095,981, in their entireties, are incorporated by reference herein.

BACKGROUND

A large amount of cargo is transported by rail. Some types of cargo may be transported in bulk by simply dumping, pouring, or otherwise transferring that cargo directly into an appropriate type of rolling stock. The bulk cargo then assumes the shape of the interior of the rolling stock, thereby generally securing the cargo against movement within the rolling stock. For example, grains, other types of agricultural products, minerals, and other goods may be loaded directly into rail hopper cars. As another example, many types of liquids can be pumped directly into rail tank cars. In many other cases, however, cargo may take the form of discrete cargo units that do not necessarily assume the shape of a railcar interior. Examples of such cargo units include, without limitation, boxes, crates, drums, reinforced bags, plastic wrapped bundles, cased goods, metal coils, specialty heavy paper rolls, plastic or metal containers mounted on pallets, other types of palletized cargo, etc.

Applicable regulations require that cargo units be restrained against lateral and longitudinal shifting during rail transport. In particular, a railcar may experience significant acceleration in the longitudinal direction between the front and rear of the railcar. Such acceleration may occur as a train is repeatedly humped while additional cars are added, when the train begins moving, when the train comes to a stop, etc. If cargo units within the railcar are not restrained, they may shift and collide with each other or with walls of the railcar. The amount of cargo within a single railcar can be substantial (e.g., up to 100 tons). At a minimum, shifting cargo units can thus cause cargo damage. In some cases, damage to the railcar, derailment or other property damage can result.

Conventionally, cargo units have been restrained within railcars using dunnage materials formed from paper. These dunnage materials typically have a honeycomb or other type of cellular structure and are used to fill spaces between cargo units and/or between cargo units and interior walls of a railcar. Using such materials for cargo restraint in railcars has proved unsatisfactory in several respects. Cellular paper dunnage material is crushed when subjected to sufficient impact, but does not rebound. Although that dunnage material may protect cargo from damage during the event that causes the dunnage material to be crushed, a void space then remains around the cargo. When the next acceleration event occurs, the cargo may shift and cause damage. Furthermore, the strength of these paper-based products can be severely compromised when exposed to moisture, which can be common in an industrial shipping environment.

Another conventional restraining technique involves the use of inflatable bags placed between cargo units and/or placed between cargo units and interior walls of a railcar. However, such bags often inflate in a cylindrical manner. As a result, significant void spaces may still remain between cargo units and/or between cargo units and walls of a railcar, and cargo may not be restrained in a secure manner. Furthermore, the internal pressure in an air dunnage bag fluctuates as temperature, barometric pressure, and altitude fluctuate. If an air dunnage bag is inflated in a railcar loaded at sea level, for example, that same bag may not maintain correct pressure to perform as desired at a final destination located in a mountainous region. Because railcars commonly move across the country, such bag pressure variation can severely impact the practicality and consistency of cargo restraint methods that rely on inflatable dunnage.

SUMMARY

This Summary is provided to introduce a selection of concepts in a simplified form that are further described below in the Detailed Description. This Summary is not intended to identify key features or essential features of the invention.

In some embodiments, a cargo restraint panel may include a foam component. That foam component may have at least one polymer foam sheet. The foam component may include a foam component front face, a foam component rear face, and a plurality of foam component side faces. The foam component side faces may be located between the foam component front face and the foam component rear face. A front face fibrous reinforcing material may be bonded to and substantially cover the foam component front face. A rear face fibrous reinforcing material may be bonded to and substantially cover the foam component rear face. The cargo restraint panel may include one or more edge guards. Embodiments also include methods for securing cargo in a railcar or other conveyance by, e.g., placing cargo restraint panels between cargo units. Additional embodiments are described herein.

BRIEF DESCRIPTION OF THE DRAWINGS

Some embodiments are illustrated by way of example, and not by way of limitation, in the figures of the accompanying drawings and in which like reference numerals refer to similar elements.

FIG. 4A shows a front face of a cargo restraint panel according to some embodiments.

FIG. 4B is a cross-sectional view from the location indicated in FIG. 4A.

FIGS. 6A through 6C are respective front, side, and rear views of a cargo restraint panel according to additional embodiments.

FIGS. 7A and 7B are side views of a cargo restraint panel according to some additional embodiments.

DETAILED DESCRIPTION

Cargo restraint panels comprising sheets of polymer foam material may be used to secure cargo units within a railcar. In at least some embodiments, the polymer foam material is expanded polystyrene (EPS). EPS is commercially available in large sizes and in a variety of densities. In some embodiments, EPS used for a cargo restraint panel may have a density of between about 0.5 pounds per cubic foot (PCF) and about 2.0 PCF. Example grades of EPS that may be used include, without limitation, ASTM C 578 Type XI (0.70-0.89 PCF), Type I (0.9-1.14 PCF), Type VIII (1.15-1.34 PCF), Type II (1.35-1.79 PCF), and Type IX (1.80-2.20 PCF). Other grades of EPS foam and/or or other densities may alternatively be used. EPS may be obtained in prefabricated sheets having desired dimensions. EPS may also or alternatively be obtained in large blocks from which sheets of desired dimensions may be cut using known techniques (e.g., using an electric hot wire cutting tool).

EPS is highly shock absorbent and has a high compressive strength. Moreover, and unlike paper dunnage, EPS is elastic. After being compressed, an EPS sheet returns to its original shape when the compressive force is removed. EPS is extremely lightweight, and unlike paper dunnage material, can be re-used.

Figure 1A:
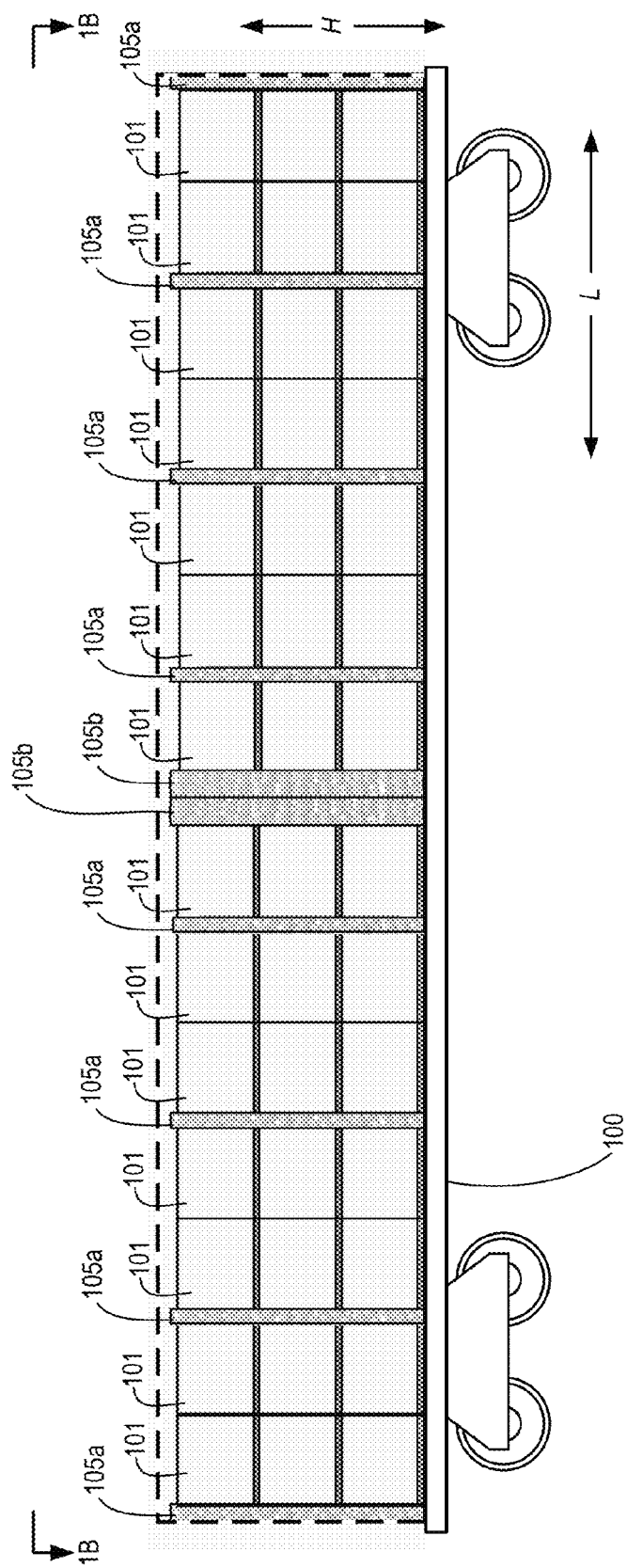
FIGS. 1A and 1B illustrate an example of cargo unit restraint, within a railcar and using cargo restraint panels, according to some embodiments.
Figure 1B:
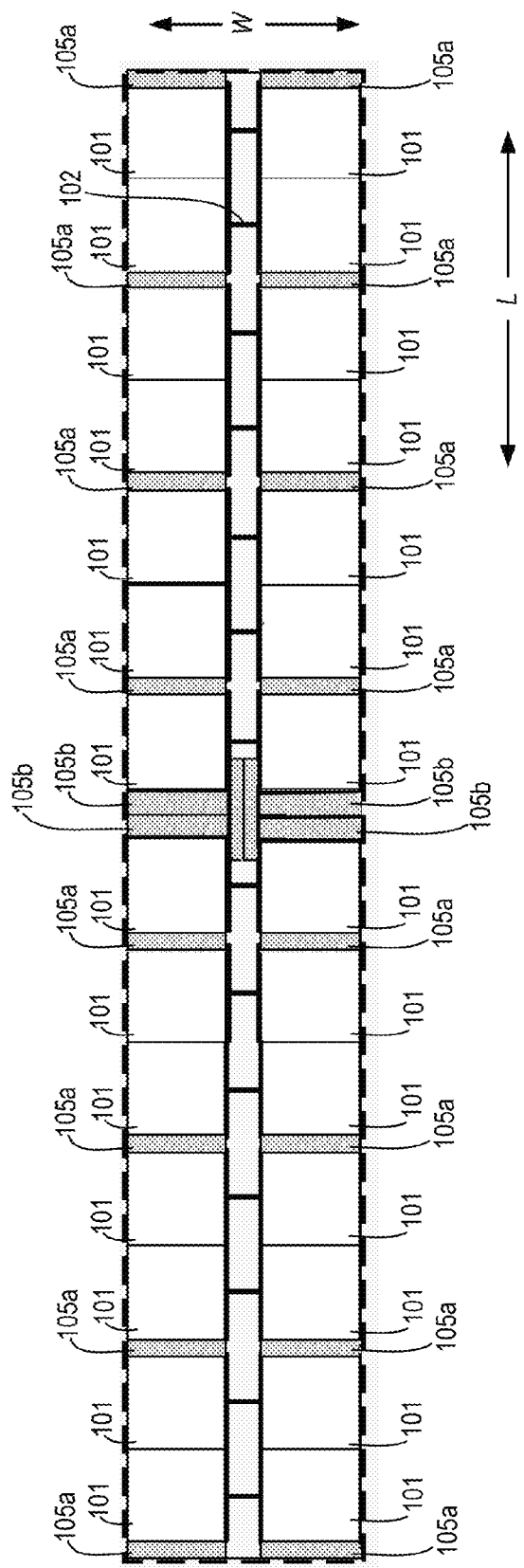

FIG. 1A is a side view of a railcar 100 showing one example of cargo unit restraint using cargo restraint panels 105. In the example of FIG. 1A, railcar 100 is a boxcar. In other embodiments, cargo units may be restrained within other types of railcars using cargo restraint panels such as are disclosed herein. FIG. 1B is a top view of railcar 100. In FIGS. 1A and 1B, the top, the side walls, and the end walls of railcar 100 have been omitted for purposes of explanation. The outline of the inner surfaces of the railcar 100 ceiling, side walls, and end walls are shown with broken lines. For convenience, a length axis L, a width axis W, and a height axis H are also indicated. Subsequent references to length, width, or height within a railcar refer to dimensions along axes L, W, and H, respectively.

Situated within railcar 100 are a plurality of cargo units 101. In the example of FIGS. 1A and 1B, cargo units 101 are uniformly sized and are arranged in stacks that comprise three units in the direction of axis H. Cargo units 101 are arranged in rows that comprise two cargo units 101 extending across the width of railcar 100. In other embodiments, cargo units secured within a railcar may be of different sizes, may be of non-uniform sizes, and/or may be arranged in another manner.

Along axis W, cargo units are separated by void filling elements 102. Elements 102 may be, e.g., expandable void fillers such as those sold under the name Void Gard® by Walnut Industries, Inc. of Bensalem, Pa., US, and/or as described in one or more of U.S. Pat. Nos. 7,604,443, 7,708,508, or 7,726,920, all of which are incorporated by reference herein. Other types of void fillers can also or alternatively be used to fill voids between cargo units in the direction of axis W and/or between cargo units and a side wall of a railcar.

In the direction of axis L, cargo restraint panels 105 are interposed between stacks of cargo units 101 and between stacks of cargo units 101 and end walls of railcar 100. In the example of FIGS. 1A and 1B, some of cargo restraint panels 105 include cargo restraint panels 105a, each of which is a four inch thick polymer foam sheet. Cargo restraint panels 105 also include cargo restraint panels 105b, each of which is an eight inch thick polymer foam sheet. Each of the polymer foam sheets in panels 105 is a continuous piece of polymer foam and has a height and width extending over substantially all of cargo units 101 in a stack. In other embodiments, and as described in more detail below, some or all of cargo restraint panels 105 may be replaced with one or more cargo restraint panels that comprise polymer foam sheets and other components.

As seen in FIGS. 1A and 1B, cargo units 100 are restrained from movement in the direction of axis L by the presence of panels 105 and by the presence of other cargo units. In particular, each cargo unit 101 is restrained from movement along axis L by elimination of gaps between the front and rear of that cargo unit and the next object (e.g., another cargo unit, a panel 105, an end wall of railcar 100) along axis L. At the ends of railcar 100, panels 105a are situated between stacks of cargo units 101 and end walls of railcar 100. Along axis L, stacks of cargo units 101 and panels 105 are arranged so that no more than two stacks are directly adjacent in the L axis direction. One or more panels 105 are placed between stacks that are not directly adjacent. During loading, stacks of cargo units 101 and panels 105 may be arranged such that panels 105 are slightly compressed.

In the example of FIGS. 1A and 1B, thicker panels 105b are used to fill the void between the stack of cargo units 101 near the center of railcar 101. In other embodiments, and depending on the size and mix of cargo units being restrained, other combinations of cargo restraint panels may be used. In some embodiments, relatively thin cargo restraint panels (e.g., consisting of or comprising one inch thick or two inch thick sheets of polymer foam) may be combined or combined with thicker panels (such as panels 105a and/or 105b) to fill the space between stacks in the center of railcar 100, and/or between other stacks of cargo units, and/or between stacks of cargo units and an end wall. One or more panels 105, and/or cargo restraint panels of other thickness(es), could also be used to separate one or more stacks of cargo units in the direction of the W axis. This may be useful if, for example, it is difficult to place a void filler element 102 in a particular location when the last cargo units are loaded. In some embodiments, panels 105 and/or cargo restraint panels of other thickness(es) may also be placed between cargo units 101 and side walls of railcar 100.

The arrangement of cargo units and cargo restraint panels shown in FIGS. 1A and 1B is merely one example of cargo restraint according to various embodiments. In some embodiments, more that two stacks of cargo units 101 may be directly adjacent, while in other embodiments, no stacks of cargo units are allowed to be directly adjacent. In some embodiments, cargo units may not be stacked. The thickness of cargo restraint panels used to separate cargo units may also vary.

Figure 2A:
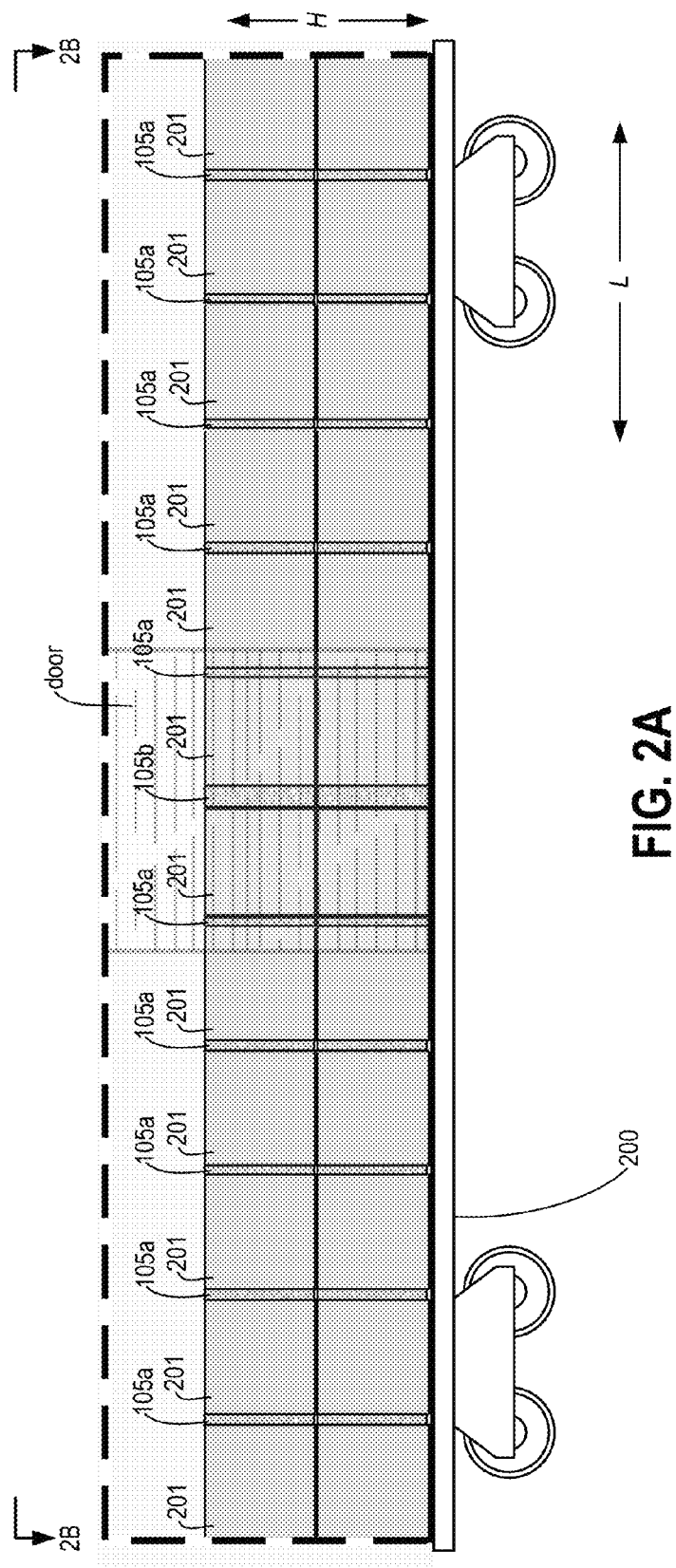
FIGS. 2A and 2B illustrate another example of cargo unit restraint, within a railcar and using cargo restraint panels, according to some embodiments.
Figure 2B:
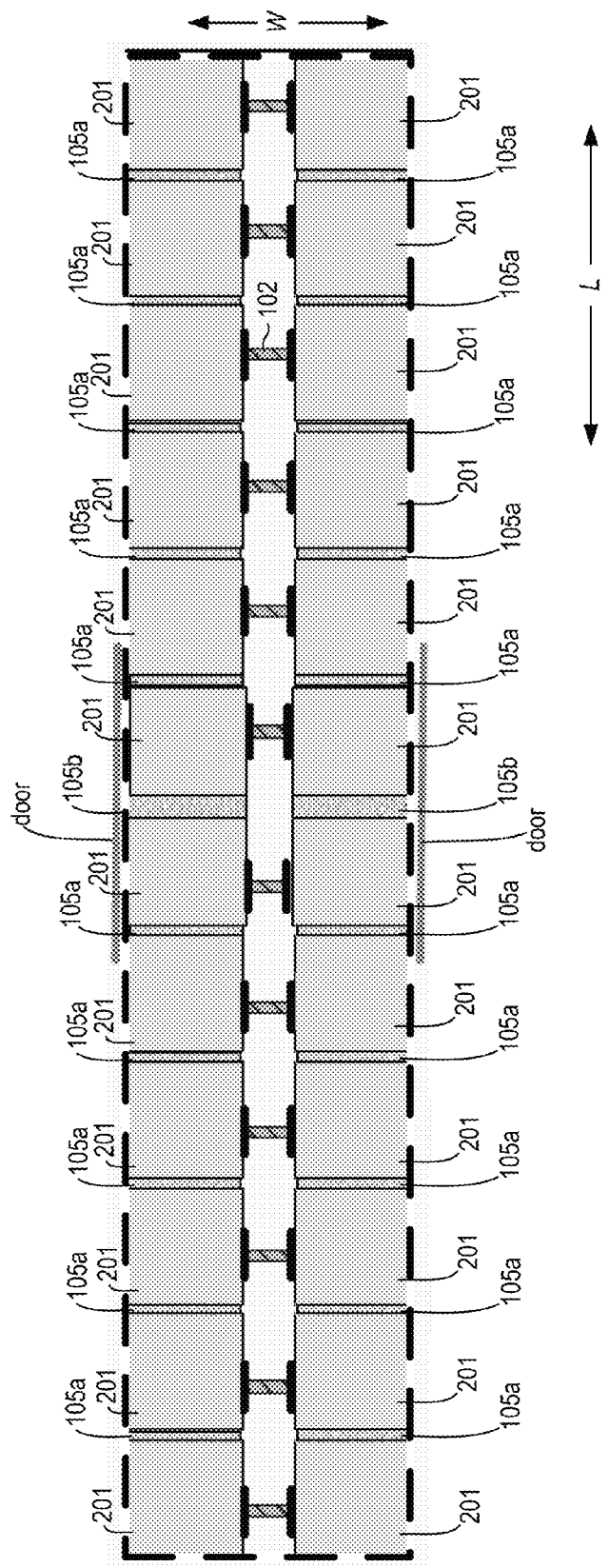

FIG. 2A is a side view of a railcar 200 showing another example of cargo unit restraint using cargo restraint panels. In the example of FIG. 2A, railcar 200 is also a boxcar. FIG. 2B is a top view of railcar 200. The top, the side walls, and the end walls of railcar 200 have been omitted from FIGS. 2A and 2B for purposes of explanation. The outline of the inner surfaces of the railcar 200 ceiling, side walls, and end walls are shown with broken lines. Length axis L, width axis W, and height axis H are also indicated.

Situated within railcar 200 are a plurality of cargo units 201. In the example of FIGS. 2A and 2B, cargo units 201 are uniformly sized and are arranged in stacks that comprise two units in the direction of axis H. Cargo units 201 are arranged in rows that comprise two cargo units 201 extending across the width of railcar 200. In other embodiments, cargo units secured within a railcar may be of different sizes, may be of non-uniform sizes, and/or may be arranged in another manner. Along axis W, cargo units are separated by void filling elements 102. As with the example of FIGS. 1A and 1B, other types of void fillers can also or alternatively be used to fill voids between cargo units in the direction of axis W and/or between cargo units and a side wall of a railcar. In the direction of axis L, cargo restraint panels 105 are interposed between stacks of cargo units 201. In the example of FIGS. 2A and 2B, cargo units 201 are placed directly against the interior surfaces of the railcar 200 end walls. In other embodiments, however, cargo restraint panels may be interposed between cargo units 201 and the end walls in a manner similar to that shown in FIGS. 1A and 1B.

As seen in FIGS. 2A and 2B, each of panels 105 has a height and width extending over substantially all of cargo units 201 in a stack. Cargo units 201 are restrained from movement in the direction of axis L by the presence of panels 105 and by the presence of other cargo units. In particular, each cargo unit 201 is restrained from movement along axis L by elimination of gaps between the front and rear of that cargo unit and the next object (e.g., another cargo unit, a panel 105, an end wall of railcar 200) along axis L. Along axis L, stacks of cargo units 201 and panels 105 are arranged so that no two stacks are directly adjacent in the L axis direction, and a panel 105 is placed between each stack. During loading, stacks of cargo units 201 and panels 105 may be arranged such that panels 105 are slightly compressed. In other embodiments, and as described in more detail below, some or all of cargo restraint panels 105 may be replaced with one or more cargo restraint panels that comprise polymer foam sheets and other components.

In the example of FIGS. 2A and 2B, thicker panels 105b are used so as to fill the void between the stack of cargo units 201 near the center of railcar 200. In other embodiments, and depending on the size and mix of cargo units being restrained, other combinations of cargo restraint panels may be used. In some embodiments, relatively thin cargo restraint panels (e.g., comprising or consisting of 1 inch thick or 2 inch thick polymer foam sheets) may be combined or combined with thicker panels (such as panels 105a and/or 105b) to fill the space between stacks in the center of railcar 100, and/or to fill spaces between other stacks of cargo units, and/or to fill spaces between stacks of cargo units and an end wall. One or more panels 105, and/or cargo restraint panels of other thickness(es), could also be used to separate one or more stacks of cargo units in the direction of the W axis. This may be useful if, for example, it is difficult to place a void filler element 102 in a particular location when the last cargo units are loaded. In some embodiments, panels 105 and/or panels of other thickness(es) may also be placed between cargo units 201 and side walls of railcar 200.

Figure 3B:
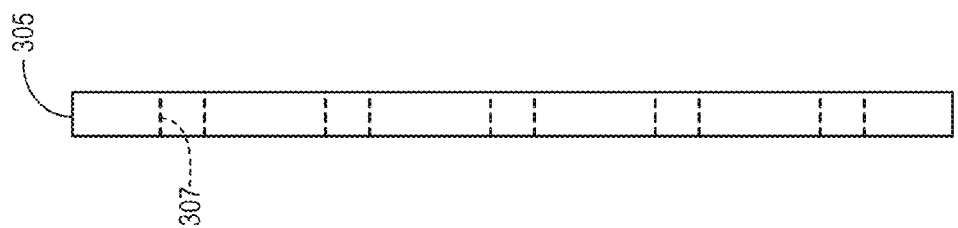
FIGS. 3A and 3B show a cargo restraint panel used to restrain cargo in some embodiments.
Figure 3A:
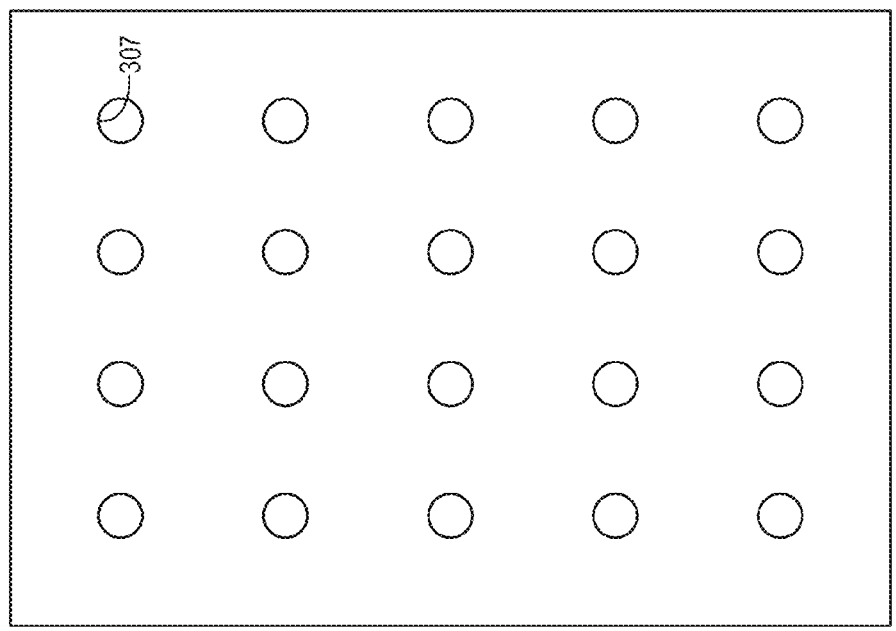

In the examples of FIGS. 1A-2B, cargo restraint panels 105 used to separate cargo units and to separate cargo units from railcar end walls are continuous polymer foam sheets without any openings. In other embodiments, a polymer foam sheet of a cargo restraint panel may include one or more openings. FIG. 3A is a front view of a cargo restraint panel 305 according to one such embodiment. FIG. 3B is a side view of panel 305. Panel 305 is a sheet of polymer foam that includes a plurality of openings 307 that pass completely through the thickness of the polymer foam sheet. Such openings may be included so as to lighten panel 305, to provide openings through which lashings may pass when panel 305 is secured when not being used, to allow ventilation, and/or for other purposes. The size and/or arrangement of openings may vary.

In some embodiments, a cargo restraint panel may have a facing material (e.g., adhesive backed paper) applied to a face that will contact a cargo unit. Such facing material may be replaceable and in some embodiments used to help prevent dirt from soiling restrained cargo.

In some embodiments, a cargo restraint panel may having a reinforced facing material bonded to one or more faces so as to prevent puncture and/or other types of damage to a polymer foam sheet of the panel. As used herein, a first element is "bonded" to a second element when the first element is firmly fixed relative to the second element across most or all of the interface between those elements. Bonding can include adhesive attachment using glue. Bonding can also include fusion whereby one or both of the first and second elements, and/or other elements, solidify (e.g., after partial melting) so as to hold the first and second elements in a fixed relationship to one another. Bonding can be direct or indirect. For example, a first element and a second element could be indirectly bonded to one another by each being bonded to an intermediate third element.

Figure 4C:
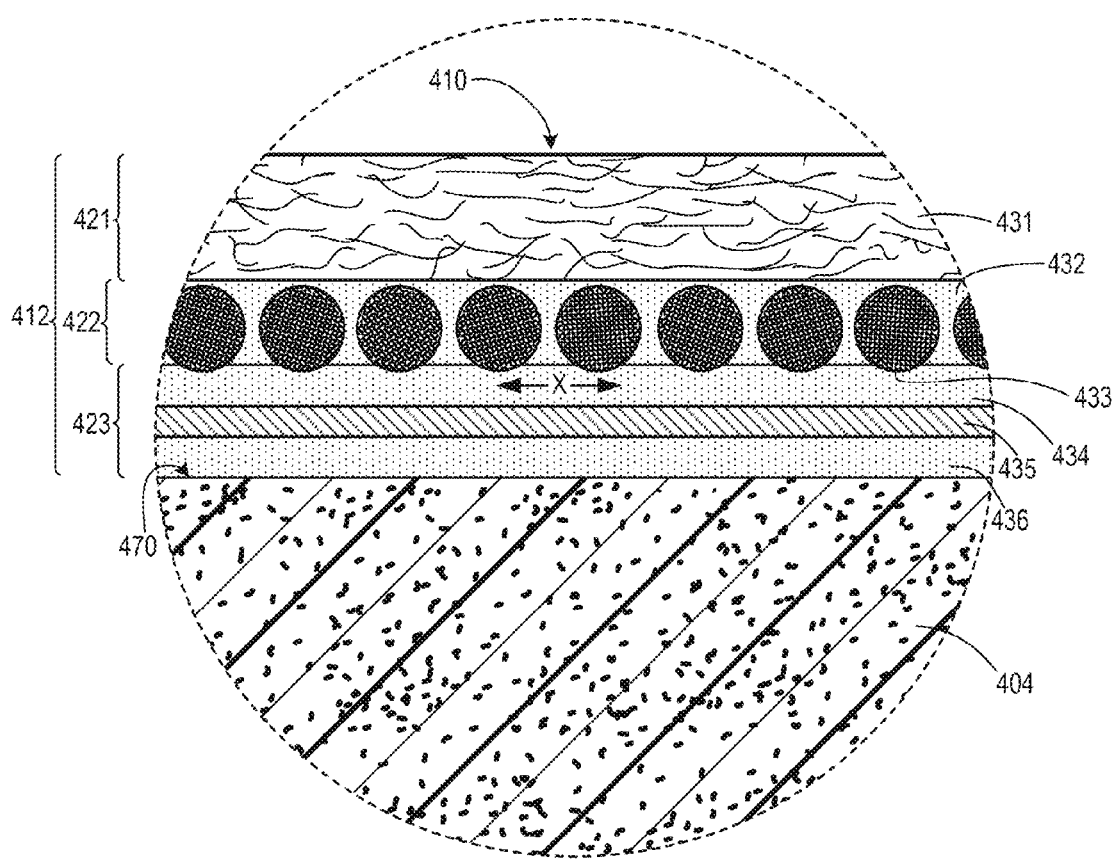
FIGS. 4C and 4D are enlarged cross-sectional views from the locations indicated in FIG. 4B.

In some embodiments, a cargo restraint panel may include a foam component having a fibrous reinforcing material bonded to one or more faces. The foam component may be a single polymer foam sheet or may include multiple polymer foam sheets. FIG. 4A is a front view of a cargo restraint panel 405 according to one such embodiment. FIG. 4B is a cross-sectional view of panel 405 from the location indicated in FIG. 4A. Panel 405 includes a front face 410, a rear face 411, and side faces 413 through 416. Panel 405 includes a foam component 404. In the embodiment of FIGS. 4A through 4D, foam component 404 is a single polymer foam sheet. Foam component 404 has a front face 470, a rear face 471, and side faces 473-476. In other embodiments, and as described below, a foam component may include multiple polymer foam sheets.

Sheets 412 of reinforced facing material are bonded to front face 470 and rear face 471 of foam component 404. For purposes of illustration, portions of reinforced facing material 412 are shown peeled away from faces 470 and 471 in FIG. 4B. In at least some embodiments, however, reinforced facing material is permanently bonded to a foam component. In the embodiment of FIGS. 4A through 4D, there is no facing material applied to side faces 473-476 of foam component 404, and thus side faces 473-476 of foam component 404 respectively coincide with side faces 413-416 of panel 405. As seen in FIG. 4B, and as explained in more detail below, front and rear faces 410 and 411 of panel 405 are formed by reinforced facing material 412 bonded to faces 470 and 471 of foam component 404.

In some embodiments, the reinforced facing material applied to a face of a polymer foam sheet may be a fibrous reinforcing material. In some such embodiments, that fibrous reinforcing material may have a structure that is similar to the construction of the portion of a load restraint strip configured to adhere to an interior wall of a cargo container. Examples of such load restraint strips include, without limitation, those described in U.S. Pat. Nos. 6,089,802, 6,227,779, 6,607,337, 6,896,459, 6,923,609, 7,018,151, 7,066,698, 7,290,969, 7,329,074, 8,113,752, 8,128,324, 8,403,607, 8,403,608, 8,403,609, 8,408,852, 8,419,329, 8,979,449, and U.S. patent application Ser. No. 14/463,352. All of said patents and said patent application are incorporated by reference herein. Additional examples include, without limitation, load restraint strips sold under the name Ty-Gard 2000® by Walnut Industries, Inc. of Bensalem, Pa., US.

The portion of a load restraint strip configured to adhere to an interior wall of a cargo container (hereinafter, "container wall adhering portion") may include an adhesive layer that is covered by a release paper backing. At the time of use, the release paper backing is removed, and the exposed adhesive layer may then placed into contact with a container wall. The container wall adhering portion is typically less than the entire load restraint strip. In particular, the adhesive intended for adherence to a container wall may not extend the entire length of the load restraint strip. In some embodiments, the container wall adhering portion may be cut from a load restraint strip and used as facing material 412. After cutting the container wall adhering portion from the rest of the load restraint strip, the adhesive release paper may be removed to expose the adhesive layer, and the adhesive layer then applied to a face of a foam component. In other embodiments, a facing material may be a specially fabricated sheet that has a structure similar to that of a container wall adhering portion of a load restraint strip, but with the adhesive extending the entire length and width of the facing material.

FIG. 4C is an enlarged cross-sectional view from the location indicated in FIG. 4B. Facing material 412 may cover all of front face 470 of foam component 404, and the structure shown in FIG. 4C may be representative of the entire front face 410 of panel 405. As seen in FIG. 4C, facing material 412 includes a base layer 421, a reinforcement layer 422, and an attachment layer 423. Base layer 421 includes a sheet 431 of base layer material. Sheet 431 may be, e.g., a continuous piece of spun bonded polyethylene fiber material. Examples of such material includes the product sold under the trade name TYVEK. In other embodiments, another material may be used in base layer 421. Examples of other base layer materials include bands of other types of spun bonded polymer fibers, films of polyester, polyethylene terephthalate (e.g., such as films sold under the trade name MYLAR) or other polymers, paper, bands of woven, knitted or felted natural fibers (e.g., cotton), and bands of woven or knitted artificial fibers. In still other embodiments, multiple materials may be used in a base layer and/or a base layer may comprise multiple separate material pieces. Exemplary thicknesses for a spun bonded polyester fiber base layer 421 are between 8 mils and 11 mils, where 1 mil=0.001 inch=0.0254 millimeters (mm). This range is solely for purposes of example, however. Embodiments include cargo restraint panels having a reinforcing material in which a base layer material band has a thickness substantially outside this range. Embodiments also include cargo restraint panels having a fibrous reinforcing material that lacks a layer such as base layer 421, and/or in which a reinforcement layer is directly bonded to a foam component face.

Reinforcement layer 422 is fixed relative to base layer 421. In particular, reinforcement fibers 433 are bonded to a side of sheet 431 by a laminating adhesive 432. In some embodiments, fibers 433 are parallel to one another and may extend from one edge of face 410 to an opposite edge. In some embodiments, fibers 433 are bundles of polymer strands having a denier (i.e., a linear mass density in grams per 9000 meters) of between about 1400 and about 1650. In some embodiments, there may be between 5 and 25 fibers 433 per inch in a direction perpendicular to the fibers. That direction is labeled "X" in FIG. 4C. Exemplary materials for the strands of fibers 433 include polyester. Embodiments also include cargo restraint panels in which a reinforcement layer comprises reinforcement fibers formed from one or more other materials (e.g., glass, polypropylene, carbon), embodiments in which reinforcement fibers have other denier values, and embodiments in which the number of fibers per inch less than 5 or greater than 25.

In at least some embodiments, laminating adhesive 432 may be an ethylene vinyl acetate water based copolymer adhesive. Embodiments include cargo restraint panels in which other types of laminating adhesive are used. Attachment layer 423 is fixed relative to reinforcement layer 422 and relative to face 470 of foam component 404. In some embodiments, attachment layer 423 may comprise a first adhesive layer 434, a second adhesive layer 436 and a substrate layer 435. Substrate layer 435 at least partially separates adhesive layers 434 and 436. In some embodiments, however, substrate layer 435 may include holes or other perforations permitting direct contact between adhesive layers 434 and 436 in certain regions. In some embodiments, substrate layer 435 may be absent. In at least some embodiments, adhesive layers 434 and 436 may comprise an acrylic adhesive and substrate layer 435 may comprise a film of polyethylene terephthalate (PET) or other polymer. In some embodiments, attachment layer 423 may be an adhesive similar to that used for laminating adhesive 432.

Figure 4D:
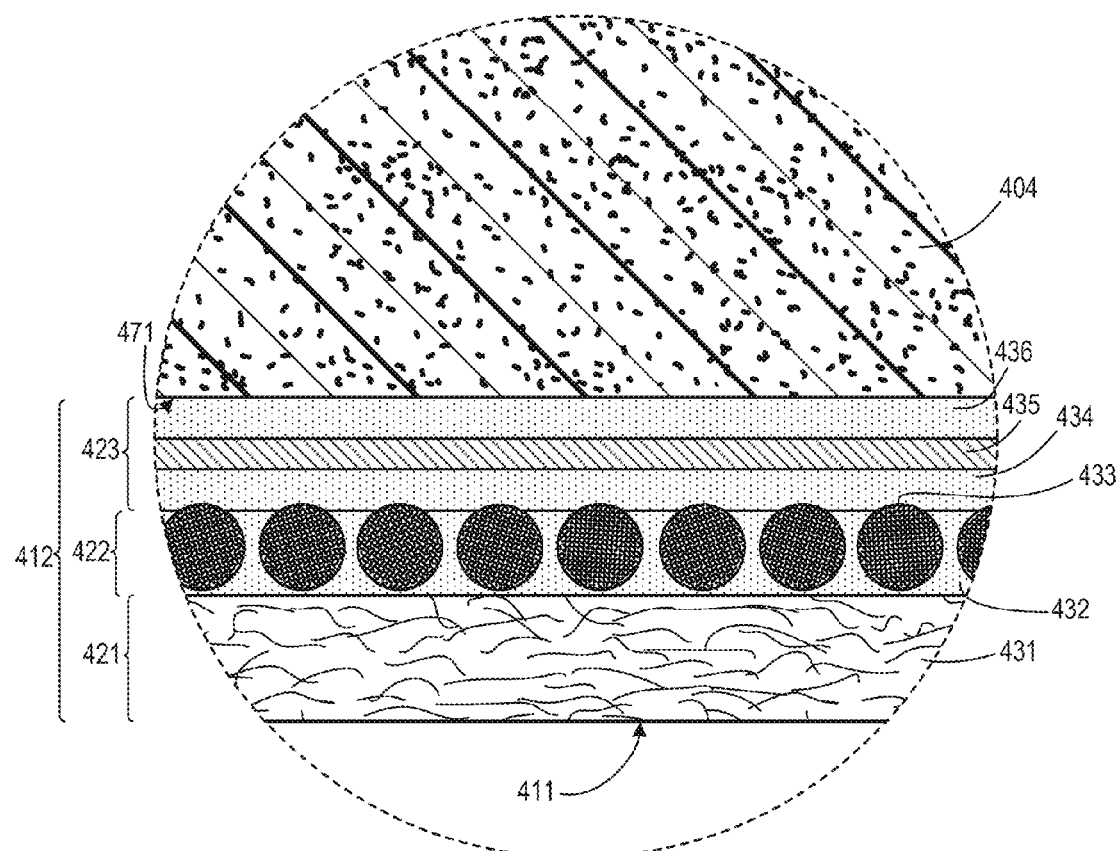

FIG. 4D is an enlarged cross-sectional view from the location indicated in FIG. 4B. Facing material 412 may cover all of rear face 471 of foam component 404, and the structure shown in FIG. 4D may be representative of the entire rear face 411 of panel 405. As seen in FIG. 4D, the facing material 412 applied to rear face 471 may be the same as that applied to face 470.

Although cargo restraint panel 405 has reinforced facing material applied to two faces, embodiments include cargo restraint panels having facing material on fewer, more, or all faces of a foam component. For example, facing material 412 could be applied to one or more of side faces 473-476 of foam component 404 in a manner similar to the manner in which material 412 is applied to front face 470 and rear face 471. In some embodiments, a cargo restraint panel may comprise different types of facing material applied to different locations.

Figure 5:
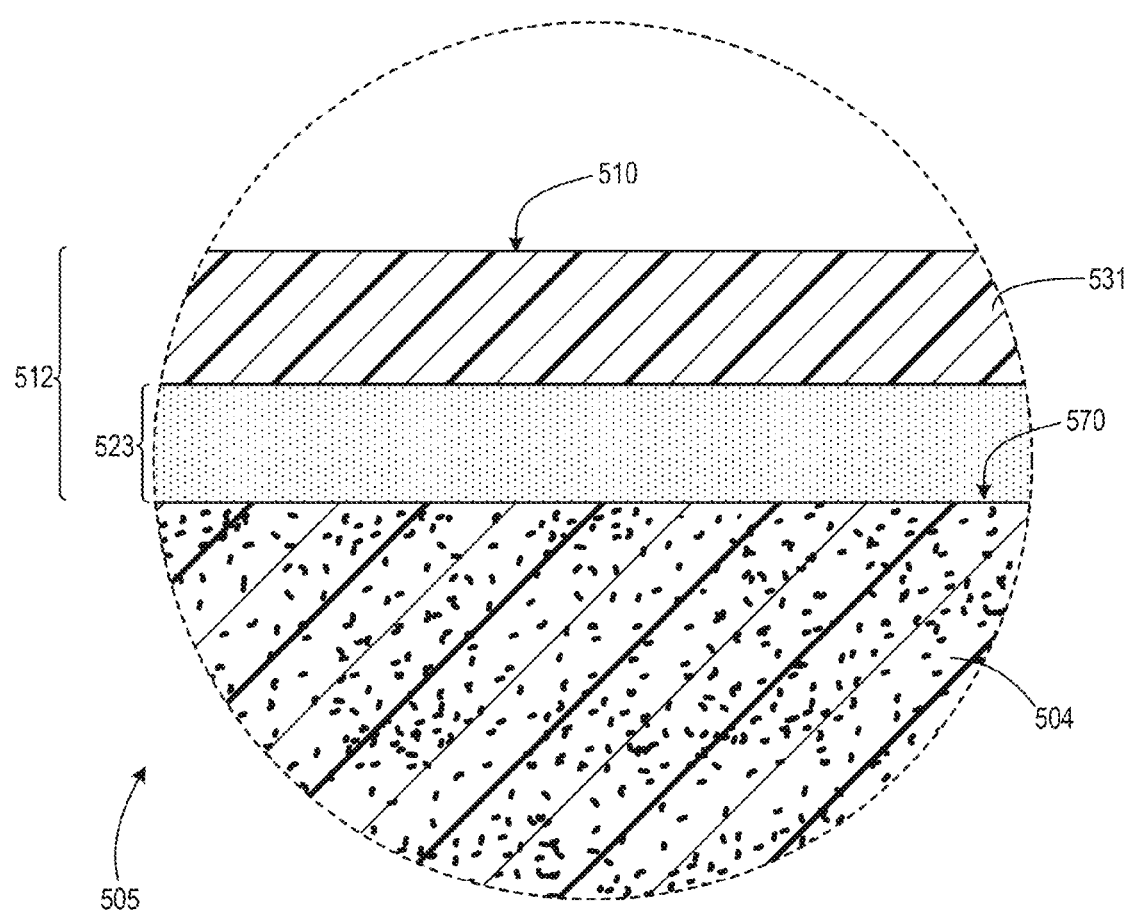
FIG. 5 is an enlarged cross-sectional view of a cargo restraint panel according to some additional embodiments.

FIG. 5 is an enlarged cross sectional view of a cargo restraint panel 505 taken from a location similar to that of the cross sectional view of FIG. 4C. Similar to cargo restraint panel 405, cargo restraint panel 505 includes a foam component 504 that is a single polymer foam sheet. Facing material 512 may cover all of a front face 570 of foam component 504, and the structure shown in FIG. 5 may be representative of an entire front face 510 of panel 505. In the embodiment of FIG. 5, the facing material 512 comprises a monolithic polymer sheet 531 bonded to face 570 of foam component 504 by a layer of adhesive 523. Sheet 531 may be, e.g., polyethylene terephthalate. Other types of polymer materials may be used for sheet 531. Adhesive layer 523 may comprise an ethylene vinyl acetate water based copolymer adhesive, an acrylic adhesive, or some other type of adhesive. A rear and/or one or more side faces of foam component 504 may be covered by facing material 512 in a manner similar to front face 570.

The reinforced facing materials shown in FIGS. 4C-5 merely represent some examples. In other embodiments, other types of reinforcement may be included (e.g., cross-weave materials). Facing material sheets may have other structures, e.g., the relative locations of substrate layer 421 and reinforcement layer 422 could be reversed. Facing material sheets may include multiple layers of reinforcement, e.g., a layer similar to layer 422 of FIG. 4C and a layer similar to sheet 531 of FIG. 5. Additional embodiments include, without limitation: embodiments in which the facing material is similar to facing material 412, but in which base layer 421 is absent; embodiments in which the facing material is similar to facing material 412, but in which reinforcement layer 422 is absent; embodiments in which the facing material is similar to facing material 512, but in which monolithic polymer sheet 531 is replaced with a woven or knitted material; and embodiments in which a reinforcement facing material is bonded to a face of a polymer foam sheet in a different manner (e.g., fused or otherwise embedded into the face of the polymer foam sheet during a molding process).

As indicated above, some embodiments include facing material that may be similar in structure to a load restraint strip. In some such embodiments, a cargo restraint panel may be fabricated by cutting portions of load restraint strips and applying those cut portions to one or more faces of a foam component. In other embodiments, a facing material may have a similar structure, but may be formed in a different manner. As but one example, a layer of adhesive could be sprayed on one or more faces of a foam component. Reinforcing fibers could then be applied to those same faces, and the sprayed adhesive allowed to cure.

Cargo restraint panels comprising polymer foam can be reusable. This offers a substantial advantage over various types of conventional dunnage materials. Including reinforcing material on one or more faces of a cargo restraint panel helps to increase the service life of that panel by preventing damage if a panel face is subjected to a concentrated load (e.g., from a corner of a crate). In some embodiments, panel service life may be further increased by including additional reinforcement along edges of a panels' foam component. Edges of a panel may often be more exposed and subject to damaging impact from cargo, equipment, etc.

Figure 6D:
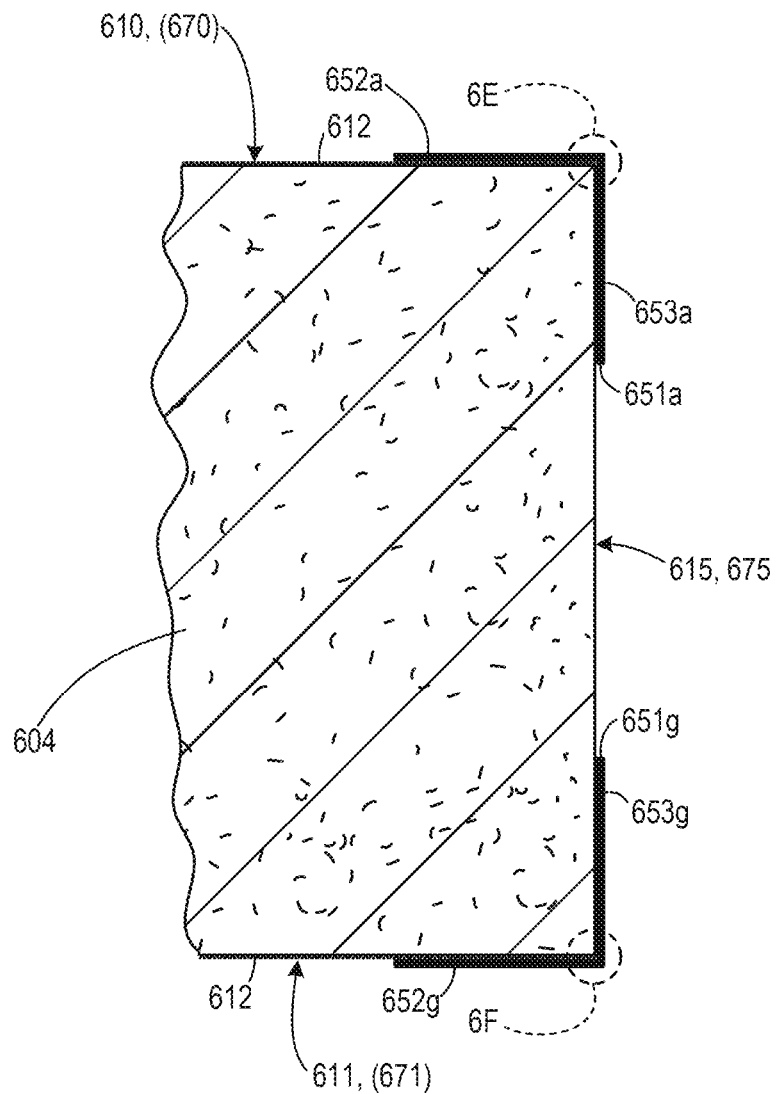
FIG. 6D is a cross-sectional view from the location indicated in FIG. 6A.

FIG. 6A is a front view of a cargo restraint panel 605 according to some embodiments. FIG. 6B is a side view of panel 605. FIG. 6C is a rear view of panel 605. Panel 605 has a front face 610, a rear face 611, and side faces 613 through 616. FIG. 6D is a cross-sectional view, from the location indicated in FIG. 6A, taken across the plane of side face 615. The irregular line in FIG. 6D indicates that a portion of panel 605 has been omitted for convenience. Cross sections taken across the planes of side faces 613, 614, and 615 would have a structure similar to that shown in FIG. 6D.

Similar to panels 405 and 505, and as best seen in FIG. 6D, panel 605 includes a foam component 604 that is a single sheet of polymer foam. Side faces 673-676 of foam component 604 are indicated in FIGS. 6A-6D. As discussed below in connection with FIGS. 6E and 6F, however, fibrous reinforcing material 612 is bonded to a front face 670 and rear face 671 of foam component 604. Because they are covered by reinforcing material 612, front face 670 and rear face 671 of foam component 604 are not visible in FIGS. 6A-6C. Accordingly, parenthetical references are used in FIGS. 6A-6C to indicate the locations of faces 670 and 671. Because side faces 673-676 are only partially covered by arms of edge guards 651, the locations of side faces 673-676 are indicated in FIGS. 6A and 6C without parentheses.

Edge guard 651*a* corresponds to an edge of foam component 604 formed at the meeting of front face 670 and side face 675. Edge guard 651*b* corresponds to an edge of foam component 604 formed at the meeting of front face 670 and side face 676. Edge guard 651*c* corresponds to an edge of foam component 604 formed at the meeting of front face 670 and side face 673. Edge guard 651*d* corresponds to an edge of foam component 604 formed at the meeting of front face 670 and side face 674. As seen in FIG. 6C, edge guards 651*e*, 651*f*, 651*g*, and 651*h* respectively correspond to an edge of foam component 604 formed at the meeting of rear face 671 and side face 673, an edge of foam component 604 formed at the meeting of rear face 671 and side face 674, an edge of foam component 604 formed at the meeting of rear face 671 and side face 675, and an edge of foam component 604 formed at the meeting of rear face 671 and side face 676. In the embodiment of panel 605, edge guards 651*a*-651*d* are formed as a first integral piece that has been bonded to foam component 604, and edge guards 651*e*-651*h* are formed as a second integral piece that has been bonded to foam component 604. In other embodiments, however, one or more of edge guards 651*a*-651*d* may be individual pieces (or multiple pieces), and one or more of guards 651*e*-651*h* may be individual pieces (or multiple pieces). Moreover, an edge guard need not be continuous.

Each of edge guards 651 includes two legs. For example, edge guard 651*a* includes legs 652*a* and 653*a*. Leg 652*a* extends over front face 670 of foam component 604 and forms a portion of front face 610 of panel 605. Leg 653*a* extends over side face 675 of foam component 604 and forms a portion of side face 615 of panel 605. Legs 652*g* and 653*g* similarly cover rear face 671 and side face 675 of foam component 604 and form portions of rear face 611 and side face 615 of panel 605.

In some embodiments, each of edge guard legs 652 extends a minimal distance over a front or rear face of foam component 604. In some such embodiments, each leg 652 may have a width w1 (FIG. 6A) of 3 inches or less. In other embodiments, each leg 652 may have a width w1 of 2 inches or less, or of 1 inch or less. Each of edge guard legs 653 may extend a minimal distance over a side face of foam component 604. In some such embodiments, each leg 653 may have a width w2 (FIG. 6B) of 3 inches or less, of 2 inches or less, or of 1 inch or less.

Figure 6E:
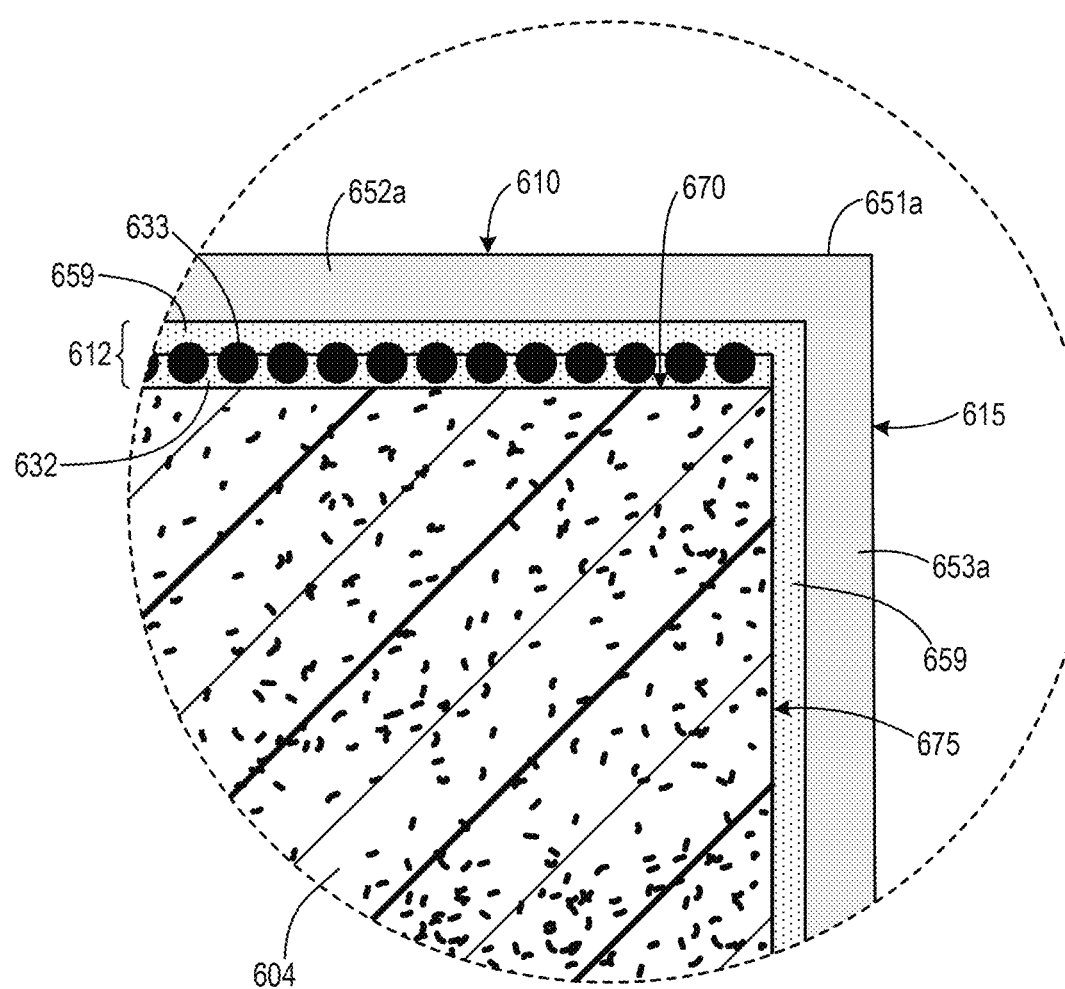
FIGS. 6E and 6F are enlarged cross-sectional views from the locations indicated in FIG. 6D.

FIG. 6E is an enlarged cross-sectional view taken from the first location indicated in FIG. 6D and shows the structure of panel 605 around the edge of foam component 604 formed by faces 670 and 675. As indicated above, foam component 604 is a single sheet of polymer foam. Reinforcing material 612 comprises parallel fibers 633 bonded to front face 670 with adhesive 632. Fibers 633 may, e.g., be similar to fibers 633 described in connection with FIG. 4C and adhesive 632 may, e.g., be similar to any of the adhesives described in connection with FIG. 4C. Fibers 633 are parallel, may cover all or substantially all of front face 670, and may have a distribution of between 5 and 25 fibers per inch in a direction perpendicular to fibers 633. In other embodiments, reinforcing fibers may have other distribution densities and/or may be arranged in a different manner. Other types of fibrous reinforcing materials, including those previously described, may alternately be used.

In the embodiment of panel 605, edge guards 651 are more rigid than the polymer foam of foam component 604, more rigid than reinforcing material 612, and less compressible than the polymer foam of foam component 604. Examples of materials that can be used to form edge guards 651 include, without limitation, plastics, plastic composites (e.g., reinforced polyethylene or polypropylene tape coated with an appropriate dry adhesive), and fiberglass composites. In some embodiments, the material of an edge guard may be similar to the material used for a fibrous reinforcing material to cover a panel face, but may include one or more additional layers of bonded fibers so as to increase the rigidity of the edge guard relative to reinforcement in other regions.

Edge guard 651a is bonded to foam component 604 with adhesive 659. In particular, leg 652a is indirectly bonded to front face 670 over reinforcing material 612. Leg 653a is directly bonded to side face 675. In other embodiments, reinforcing material may also be bonded to one or more side faces, and a leg of an edge guard could be bonded to such side face reinforcing material. Adhesive 659 may be the same as adhesive 632 or may be a different type of adhesive.

Figure 6F:
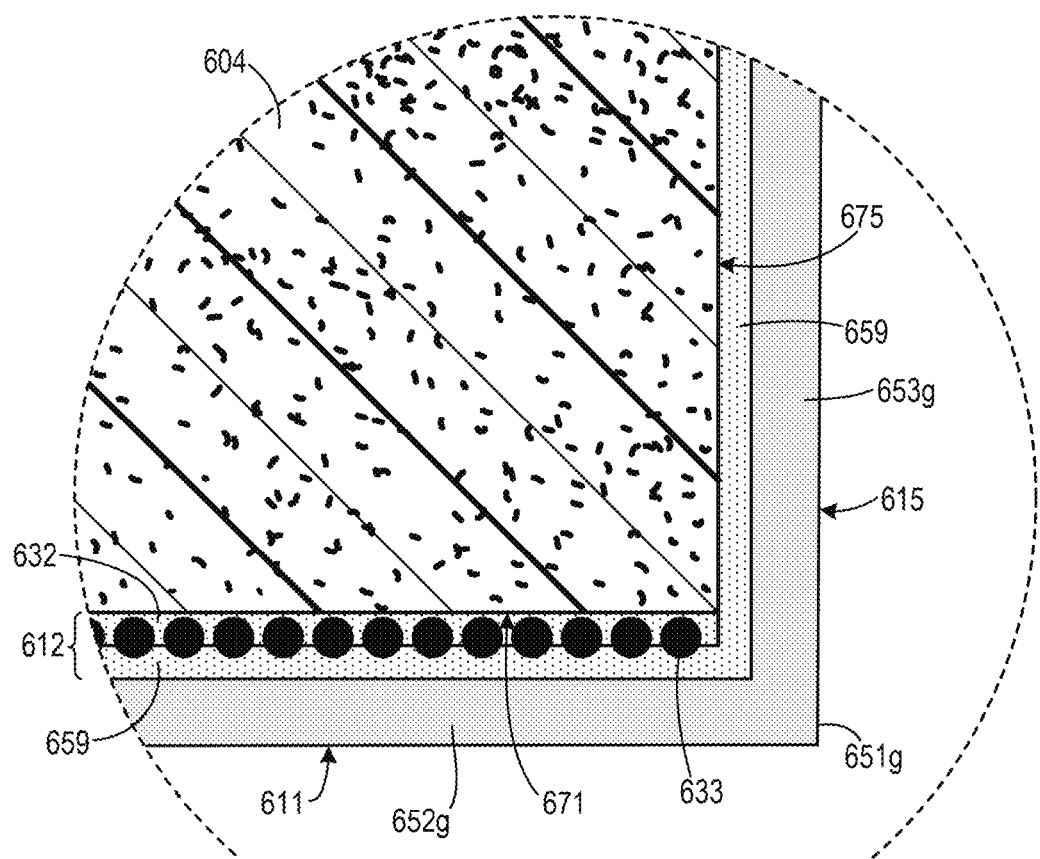

FIG. 6F is an enlarged cross-sectional view from the second location indicated in FIG. 6D and shows the structure of panel 605 around the edge of foam component 604 formed by faces 671 and 675. Parallel fibers 633 of reinforcing material 612 are bonded to rear face 671 with adhesive 632. Edge guard 651g is bonded to foam component 604 with adhesive 659. Leg 652g is indirectly bonded to front face 671 over reinforcing material 612. Leg 653g is directly bonded to side face 675. In other embodiments, a fibrous reinforcing material bonded to a foam component rear face (or to side faces) may have other configurations or be formed from other materials (e.g., as mentioned in connection with FIG. 6E). A single cargo restraint panel may include multiple types of fibrous reinforcing materials having different configurations and/or formed from different materials, and/or may include edge guards having different configurations and/or formed from different materials.

In the embodiment of panel 605, and as partially seen in FIG. 6B, portions of foam component 604 corner edges remain uncovered so as not to obstruct compression of panel 605 front face 610 toward panel 605 rear face 611. For example, the corner edge formed by side faces 675 and 674 is partially covered by legs of edge guards 651a, 651d, 651f and 651g, but the center portion of that corner edge is exposed. The other corner edges have a similar configuration. In some embodiments, a cargo restraint panel may also include protection along the full length of some or all corner edges.

FIG. 7A is a front view of a cargo restraint panel 705 according to one such embodiment. FIG. 7B is another side view of panel 705 taken from the location indicated in FIG. 7A. Except as described below, panel 705 is similar to panel 605. An element of panel 705 and a similar element of panel 605 will have reference numbers offset by 100.

Panel 705 differs from panel 605 by including edge guard extensions 754 that cover corner edges of panel 705. For example, an edge guard extension 754a projects from leg 753a of edge guard 751a and from leg 753d of edge guard 751d. An edge guard extension 754b projects from leg 753g of edge guard 751g and from leg 753f of edge guard 751f. Extensions 754a and 754b overlap so as to fully cover, with legs 753a, 753d, 753g, and 753f, the corner edge of foam component 704 formed by side face 775 and side face 774. Additional edge guard extensions are positioned in a similar manner at the other three corner edges.

Figure 7C:
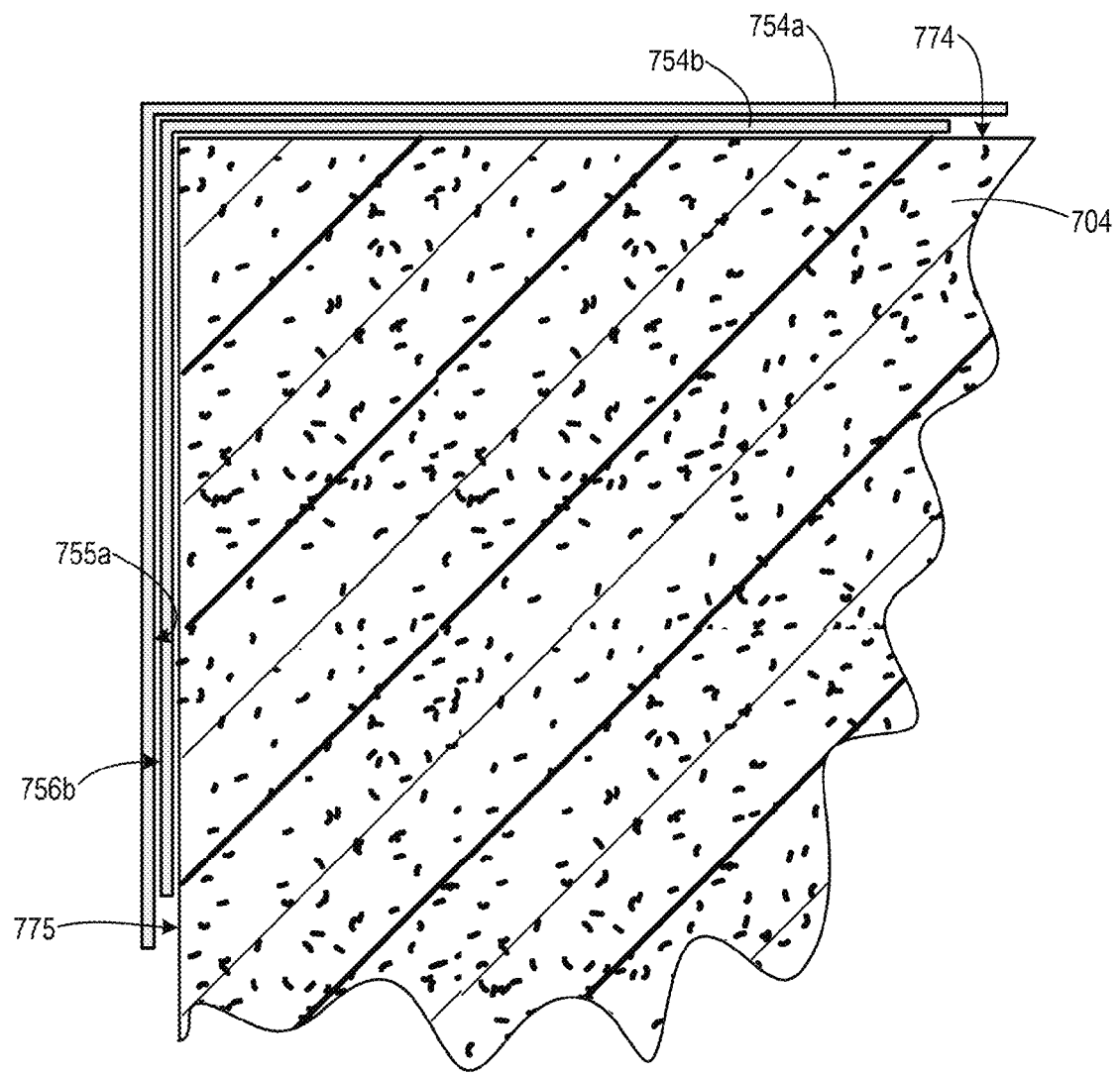
FIG. 7C is an area cross-sectional view from the location indicated in FIG. 7A.

FIG. 7C is an enlarged area cross-sectional view of panel 705 taken from the location indicated in FIG. 7B. As indicated by the irregular line, a portion of panel 705 is omitted from the figure. As seen in FIG. 7C, a portion of extension 754a rests over a portion of extension 754b. However, extensions 754a and 754b are not bonded to one another. Accordingly, when the front face 710 of panel 705 is compressed toward rear face 711, the interior side 755a of extension 754a can move across the exterior side 756b of extension 754b, and compression of panel 705 is thus not impeded.

Figure 8:
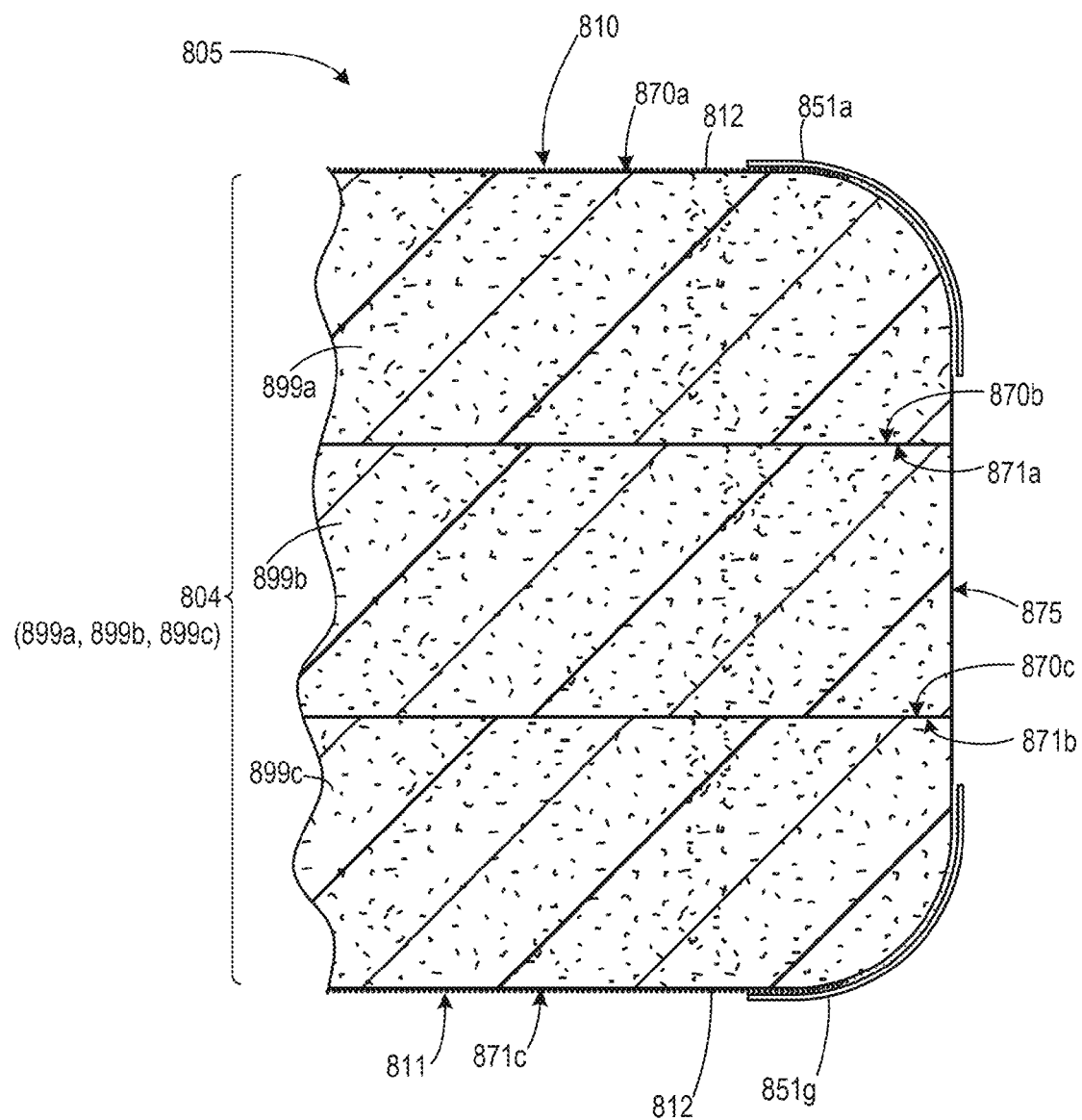
FIG. 8 is a cross-sectional view of a cargo restraint panel according to some further embodiments.

In embodiments described thus far, the foam component of a cargo restraint panel was a single sheet of polymer foam. In some embodiments, a foam component may include multiple sheets of polymer foam. In the above-described embodiments that include edge guards, the edges are square. In other embodiments, some or all edges may be rounded. FIG. 8 is a cross-sectional view of a cargo restraint panel 805 that includes a multi-sheet foam component 804 and that has rounded edges. The sectioning plane of FIG. 8 is perpendicular to a side of panel 805, similar to the sectioning plane of FIG. 6D. Sectioning planes across other sides would show similar structures. Except as described below, panel 805 may be similar to panel 605. An element of panel 805 and a similar element of panel 605 will have reference numbers offset by 200.

Panel 805 includes a foam component 804 that has three polymer foam sheets 899a, 899b, and 899c. In the embodiment of panel 805, each sheet 899 extends the entire length and width of foam component 804, but only forms approximately one-third of the thickness of component 804. A rear face 871a of sheet 899a is bonded to a front face 870b of sheet 899b. A rear face 871b of sheet 899b is bonded to a front face 870c of sheet 899c.

Edges formed by front face 870a of sheet 899a and side faces of foam component 804 are rounded and are covered by rounded edge guards, as are edges formed by rear face 871c of sheet 899c and side faces of component 804. For example, an edge guard 851a is bonded to and covers an edge formed by front face 870a of sheet 899a and side face 875 of component 804, and an edge guard 851g is bonded to and covers an edge formed by rear face 871c of sheet 899c and side face 875 of component 804. In some embodiments, corner edges of component 804 may also be rounded. Such rounded edges may be partially covered by rounded edge guards (e.g., similar to the configuration of panel 605) or may be completely covered by edge guards (e.g., similar to the configuration of panel 705). A fibrous reinforcing material 812 (which may be similar to reinforcing material 612) may be bonded to front face 870a of sheet 899a and to rear face 871c of sheet 899c.

Although panel 805 includes multiple foam sheets and rounded edges, embodiments include cargo restraint panels having multiple sheets and square edges, as well as cargo restraint panels having a single sheet foam component and rounded edges. All edges of a cargo restraint panel need not be rounded or rounded to the same shape. A multi-sheet foam component may have two polymer foam sheets or may have more than three polymer foam sheets. A multi-sheet foam component may include sheets formed from different types of foam. For example, sheets 899a and 899c could be formed of a denser polymer foam that is more resistant to damage, with sheet 899b formed from a less dense polymer foam that provides more cushioning. The arrangement of polymer foam sheets in a multi-sheet foam component is not limited a front-to-rear stack as shown in FIG. 8. In some embodiments, foam sheets may be arranged in a side-to-side fashion. Any of the various embodiments described in this paragraph may include a fibrous reinforcing material bonded to one or more foam component faces, which reinforcing material may be similar to reinforcing material 612 or to other types of fibrous reinforcement disclosed herein.

Although some embodiments described above include cargo restraint panels with edge guards placed over fibrous reinforcing material, other embodiments include cargo restraint panels in which the fibrous reinforcing material is omitted from front or rear face regions that will be covered by edge guards. Edge guards need not be included on all edges of a cargo restraint panel, and/or may only be included on front face or rear face edges.

In some embodiments, a cargo restraint panel may include a polymer coating to provide further wear protection, chemical protection, and/or other type of protection. Such polymers can include urethane and epoxy resins and concrete elastomeric materials, and can be applied by spraying or by other processes. Such coating could be applied before application of reinforcing material and edge guards (if either is used), between application of reinforcing material and edge guards (if both are used), or after application of reinforcing material and edge guards (if both are used).

Figure 9A:
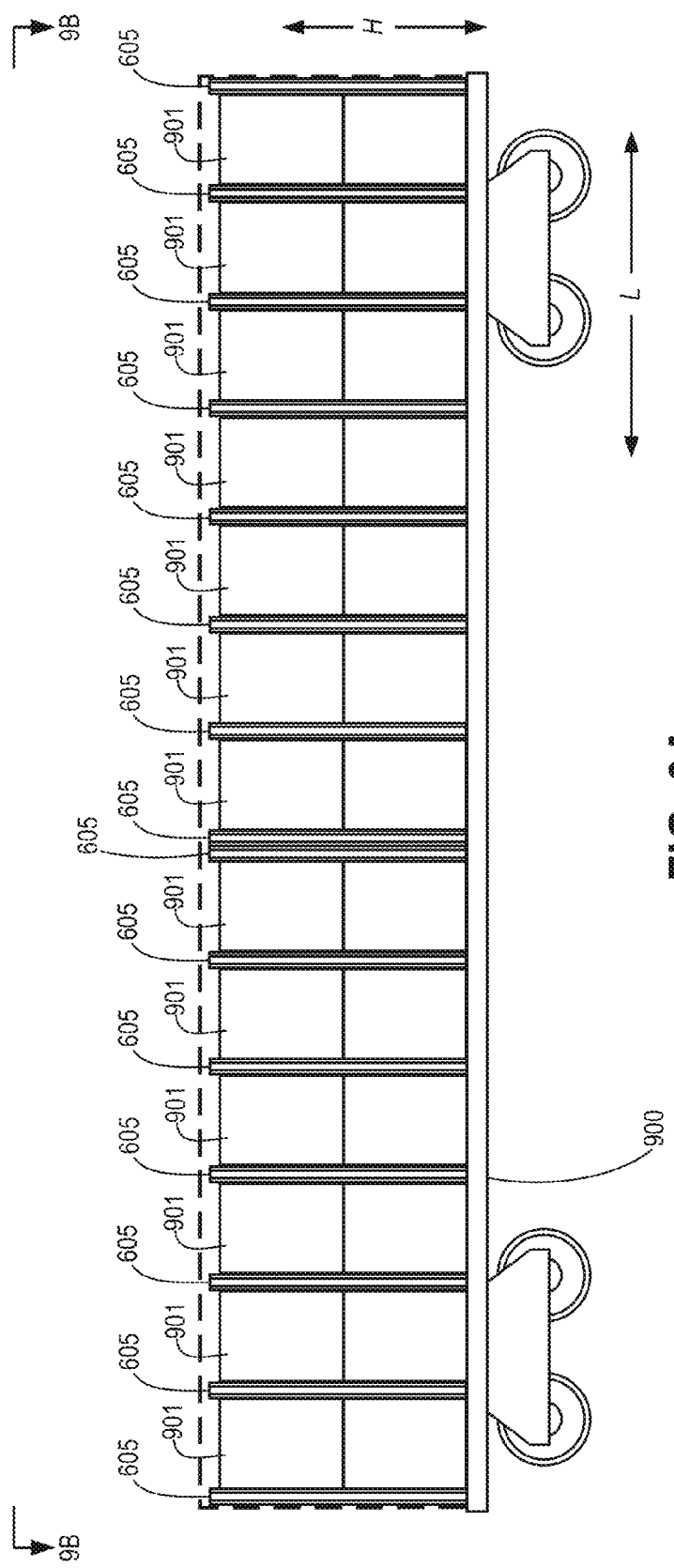
FIGS. 9A and 9B illustrate a further example of cargo unit restraint, within a railcar and using cargo restraint panels, according to some embodiments.
Figure 9B:
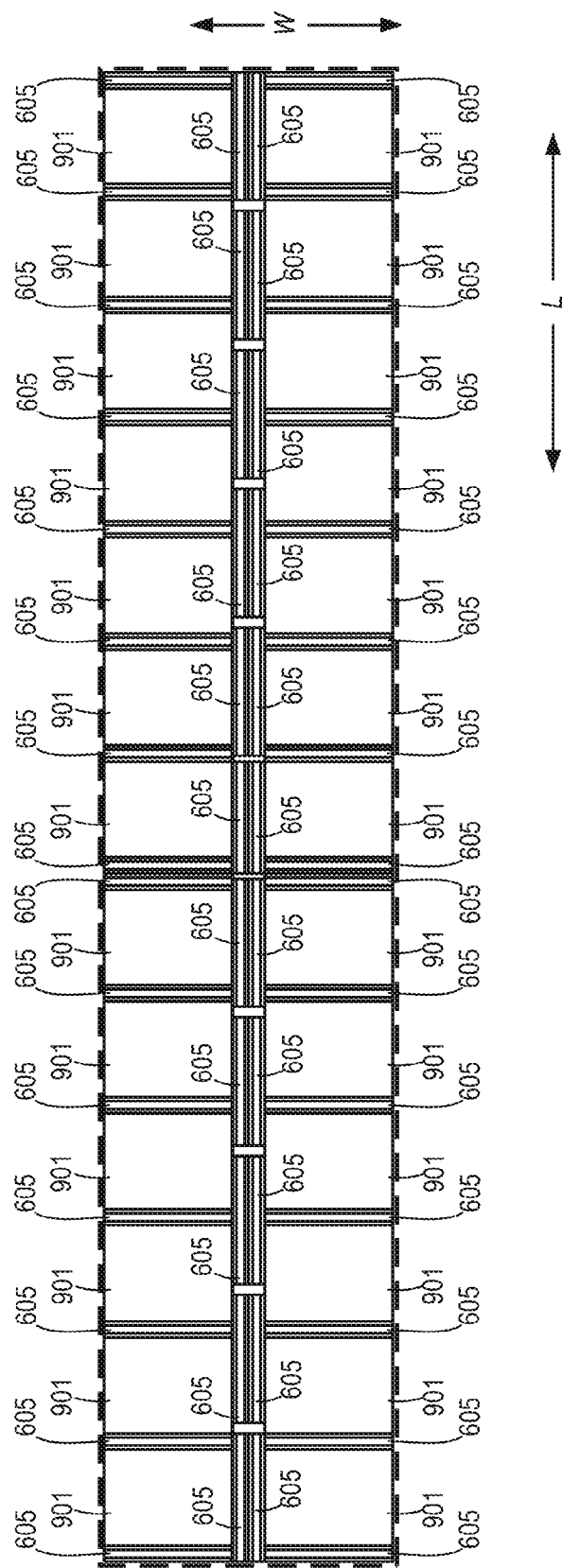

Any of the cargo restraint panels described herein can be used in configurations similar to those shown in FIGS. 1A through 2B, or in other cargo loading configurations. For example, FIG. 9A is a side view of a railcar 900 loaded with cargo units 901 separated by cargo restraint panels 605. FIG. 9B is a top view of railcar 900. In the embodiment of FIGS. 9A and 9B, cargo restraint panels 605 provide both longitudinal and lateral restraint of cargo units 901, and thus no other types of dunnage materials are needed. For example, inflatable air bags are not needed. Restraining forces on cargo units 901 are thus distributed more thoroughly and evenly. As another example, paper dunnage materials are not used, thereby avoiding problems associated with paper dunnage materials. Different types of cargo restraint panels such as described herein may be used in combination in a single loading configuration (e.g., within a single railcar).

Cargo restraint panels according to various embodiments may be provided in a wide range of sizes. In some embodiments for example, cargo restraint panels have a thicknesses ranging from 1 inch to 12 inches, with panel thickness measured on an axis perpendicular to a panel front face (e.g., perpendicular to front face 410 of panel 405). In some such embodiments, panels may have length and width dimensions, measured on axes perpendicular to the thickness axis, such that a panel front face has an area of at least 1 square foot, at least 2 square feet, at least 4 square feet, at least 9 square feet, at least 16 square feet, or at least 32 square feet.

In some embodiments, cargo restraint panels such as are disclosed herein may be used in conjunction with other types of cargo restraint. For example, one or more cargo units may be secured by lashing to the floor of a boxcar. Cargo restraint panels could then be interposed between the lashed cargo unit and other cargo units that are not lashed to the boxcar floor.

In the examples of FIGS. 1A-2B, cargo restraint panels are stacked in horizontal directions, but each panel 105 has a height that reaches almost to the ceiling of the railcar. In some embodiments, cargo restraint panels may also be stacked in the vertical direction. For example, instead of separating two 10 foot high stacks of cargo units with a single 10 foot by 4 foot by 4 inch cargo restraint panel, two 5 foot by 4 foot by 4 inch cargo restraint panels could be used. In some other embodiments, cargo restraint panels could be "stacked" in the direction of axis W. For example, instead of separating two 10 foot high stacks of cargo units with a single 10 foot by 4 foot by 4 inch cargo restraint panel, two 10 foot by 2 foot by 4 inch panels could be used.

In the examples of FIGS. 1A-2B, cargo restraint panels 105 cover the entire front and rear faces of a cargo unit. In other embodiments, a cargo restraint panel (or combination of cargo restraint panel) may cover less than all of a cargo unit face. As but one example, two 10 foot high stacks of 4 foot wide cargo units may be separated by a 9 foot by 3 foot by 4 inch cargo restraint panel that is approximately centered over the faces of the two stacks contacted by the panel.

In cargo restraint panels such as those described above, including cargo restraint panels such as those described in connection with FIGS. 1A-9B, some or all polymer foam sheets may comprise or consist of EPS (including, without limitation, the above-mentioned grades thereof). In some embodiments, a cargo restraint panel may include one or more polymer foam sheets formed from another type of polymer foam. Such panels may include panels similar to those described above, but with a one or more polymer foam sheets including or consisting of a polymer foam other than EPS. Examples of other polymer foams that may be used include, without limitation, extruded polystyrene (XEPS) (e.g., ASTM C 578-95 Type X, Type IV, Type VI, Type VII, Type V) and EPS Geofoam (e.g., ASTM D6817 EPS12 Type XI, EPS15 Type 1, EPS19 Type VIII, EPS 22 Type II, EPS29 Type IX, EPS 39 Type XIV, EPS46). In some embodiments, cargo restraint panels comprising multiple types of foam may be used in a single railcar (e.g., one or more panels may comprise EPS and one or more panels may comprise another type of polymer foam).

Although the examples of cargo restraint panels shown in the drawings are rectangular and have substantially planar and parallel front and rear faces, embodiments also include cargo restraint panels having other shapes. For example, cargo restraint panels according to some embodiments may have less than four sides or more than four sides. Cargo restraint panels according to some embodiments may be all or partially circular, may be all or partially elliptical, or otherwise have an at least partially curved shape. Side faces need not be planar and can be completely curved, can be faceted, and/or can have other configurations. Front and rear faces of a cargo restraint panel need not be parallel. Front and rear faces need not be substantially planar.

In at least some embodiments, a method of securing cargo within a railcar may include (a) placing one or more cargo restraint panels against a railcar wall or other object within a railcar interior, and (b) placing one or more cargo units in the railcar interior and against the one or more cargo restraint panels placed in (a). In some embodiments the method may include repeating steps (a) and (b) multiple times.

In some embodiments, a method may include alternately positioning cargo units and cargo restraint panels between end walls of a railcar interior. In some embodiments, the alternately positioning may include placing some cargo units in directly adjoining positions along the direction between the end walls (e.g., as in FIGS. 1A and 1B), while in other embodiments, no cargo units are placed in directly adjoining positions along the direction between the end walls (e.g., as in FIGS. 2A and 2B).

In some embodiments, a method of securing cargo in a railcar includes placing a plurality of cargo units in a railcar and placing a plurality cargo restraint panels in the railcar. The cargo units and the cargo restraint panels are arranged, in a front to rear direction of the railcar, in alternating groups of one or more cargo units separated by one or more cargo restraint panels. Each of the cargo restraint panels comprises a cargo restraint panel such as is disclosed herein. All of the cargo units may secured in the front to rear direction by one of another of the cargo units or one of the cargo restraint panels.

In methods such as those described above, cargo units and cargo restraint panels may be placed so that each of the cargo restraint panels is partially compressed. An example of such loading is shown in FIGS. 9A and 9B. In such a configuration, each of the panels may be held in place as a result of such compression. This allows loading without use of straps or other mechanisms to secure dunnage to a cargo unit. In some embodiments, and as also illustrated in FIGS. 9A and 9B, methods may include securing cargo units within a railcar using cargo restraint panels such as are disclosed herein, and without using paper dunnage materials, inflatable dunnage bags, or other types of conventional dunnage materials.

Embodiments include a railcar loaded in accordance with methods described herein.

The foregoing description of embodiments has been presented for purposes of illustration and description. The foregoing description is not intended to be exhaustive or to limit embodiments to the precise form explicitly described or mentioned herein. Modifications and variations are possible in light of the above teachings or may be acquired from practice of various embodiments. The embodiments discussed herein were chosen and described in order to explain the principles and the nature of various embodiments and their practical application to enable one skilled in the art to make and use these and other embodiments with various modifications as are suited to the particular use contemplated. Any and all permutations of features from above-described embodiments are the within the scope of the invention.

The invention claimed is:

1. A cargo restraint panel comprising:
    a foam component having at least one polymer foam sheet, the foam component including a foam component front face, a foam component rear face, and a plurality of foam component side faces, wherein the foam component side faces are located between the foam component front face and the foam component rear face;
    a facing material bonded to and substantially covering the foam component front face; and
    a plurality of front edge guards, and wherein
        the foam component front face includes a plurality of foam component front face edges,
        each of the front edge guards is less compressible than the at least one polymer foam sheet, is more rigid than the at least one polymer foam sheet, and is more rigid than the facing material,
        each of the front edge guards is secured to the cargo restraint panel and corresponds to a different one of the foam component front face edges,
        each of the front edge guards substantially covers its corresponding foam component front face edge, a portion of the foam component front face adjacent to its corresponding foam component front face edge, and a portion of the foam component side face adjacent to its corresponding foam component front face edge, and
        the facing material comprises a polymer film.
2. The cargo restraint panel of claim 1, further comprising a facing material bonded to and substantially covering the foam component rear face.

3. The cargo restraint panel of claim 1, wherein the at least one polymer foam sheet is a single polymer foam sheet having a front face forming the foam component front face, a rear face forming the foam component rear face, and a plurality of side faces forming the foam component side faces.

4. The cargo restraint panel of claim 1, wherein
    the at least one polymer foam sheet comprises first and second polymer foam sheets,
    the first polymer foam sheet has a first front face forming the foam component front face, a first rear face, and a plurality of first side faces forming portions of the foam component side faces,
    the second polymer foam sheet has a second front face oriented toward the first rear face, a second rear face forming the foam component rear face, and a plurality of second side faces forming additional portions of the foam component side faces, and
    the second polymer foam sheet is fixed relative to the first polymer foam sheet.

5. The cargo restraint panel of claim 4, further comprising a third polymer foam sheet situated between the first polymer foam sheet and the second polymer foam sheet, and wherein a density of foam material in the third polymer foam sheet is less than a density of foam material in the first polymer foam sheet and less than a density of foam material in the second polymer foam sheet.

6. The cargo restraint panel of claim 1, wherein a front face of the cargo restraint panel has an area of at least 4 square feet.

7. The cargo restraint panel of claim 1, wherein each of the portions of the foam component front face adjacent to one of the corresponding foam component front face edges and covered by one of the front edge guards is less than 2 inches wide.

8. A cargo restraint panel comprising:
    a foam component having at least one polymer foam sheet, the foam component including a foam component front face, a foam component rear face, and a plurality of foam component side faces, wherein the foam component side faces are located between the foam component front face and the foam component rear face;
    a facing material bonded to and substantially covering the foam component front face; and
    a plurality of front edge guards, and wherein
        the foam component front face includes a plurality of foam component front face edges,
        each of the front edge guards is less compressible than the at least one polymer foam sheet, is more rigid than the at least one polymer foam sheet, and is more rigid than the facing material,
        each of the front edge guards is secured to the cargo restraint panel and corresponds to a different one of the foam component front face edges, and
        each of the front edge guards substantially covers its corresponding foam component front face edge, a portion of the foam component front face adjacent to its corresponding foam component front face edge, and a portion of the foam component side face adjacent to its corresponding foam component front face edge; and
    a plurality of rear edge guards, and wherein
        the foam component rear face includes a plurality of foam component rear face edges, each of the rear edge guards is less compressible than the at least one polymer foam sheet and is more rigid than the at least one polymer foam sheet, each of the rear edge guards is secured to the cargo restraint panel and corresponds to a different one of the foam component rear face edges, and each of the rear edge guards substantially covers its corresponding foam component rear face edge, a portion of the foam component rear face adjacent to its corresponding foam component rear face edge, and a portion of the foam component side face adjacent to its corresponding foam component rear face edge.

9. The cargo restraint panel of claim 1, wherein each of the front edge guards comprises a plastic.

10. The cargo restraint panel of claim 1, wherein each of the front edge guards comprises a plastic composite.

11. The cargo restraint panel of claim 1, wherein the facing material comprises a fibrous reinforcing material, and wherein each of the front edge guards comprises additional layers of bonded fibers.

12. A cargo restraint panel comprising:
a foam component having at least one polymer foam sheet, the foam component including a foam component front face, a foam component rear face, and a plurality of foam component side faces, wherein the foam component side faces are located between the foam component front face and the foam component rear face;
a facing material bonded to and substantially covering the foam component front face; and
a plurality of front edge guards, and wherein
the foam component front face includes a plurality of foam component front face edges,
each of the front edge guards is less compressible than the at least one polymer foam sheet, is more rigid than the at least one polymer foam sheet, and is more rigid than the facing material,
each of the front edge guards is secured to the cargo restraint panel and corresponds to a different one of the foam component front face edges,
each of the front edge guards substantially covers its corresponding foam component front face edge, a portion of the foam component front face adjacent to its corresponding foam component front face edge, and a portion of the foam component side face adjacent to its corresponding foam component front face edge,
the at least one polymer foam sheet comprises expanded polystyrene,
the facing material comprises a polyethylene terephthalate sheet, and
a front face of the cargo restraint panel has an area of at least 4 square feet.

13. A method comprising:
placing a plurality of cargo units in a railcar; and
placing a plurality cargo restraint panels in the railcar, wherein
the cargo units and the cargo restraint panels are arranged, in a front to rear direction of the railcar, in alternating groups of one or more cargo units separated by one or more cargo restraint panels, and
each of the cargo restraint panels comprises
a foam component having at least one polymer foam sheet, the foam component including a foam component front face, a foam component rear face, and a plurality of foam component side faces, wherein the foam component side faces are located between the foam component front face and the foam component rear face,
a facing material bonded to and substantially covering the foam component front face, and
a plurality of front edge guards, and wherein
the foam component front face includes a plurality of foam component front face edges,
each of the front edge guards is less compressible than the at least one polymer foam sheet, is more rigid than the at least one polymer foam sheet, and is more rigid than the facing material,
each of the front edge guards is secured to the cargo restraint panel and corresponds to a different one of the foam component front face edges, and
each of the front edge guards substantially covers its corresponding foam component front face edge, a portion of the foam component front face adjacent to its corresponding foam component front face edge, and a portion of the foam component side face adjacent to its corresponding foam component front face edge.

14. The method of claim 13, wherein all of the cargo units are secured in the front to rear direction by one of another of the cargo units or one of the cargo restraint panels.

15. The method of claim 13, wherein each of the cargo restraint panels is partially compressed.

16. The method of claim 13, wherein, as to each of the cargo restraint panels,
the facing material comprises a fibrous reinforcing material bonded to and substantially covering the foam component front face, the fibrous reinforcing material comprising a plurality of substantially parallel front face fibers distributed over substantially all of the foam component front face and having a distribution density of between 5 and 25 fibers per inch in a direction perpendicular to the front face fibers.

17. The cargo restraint panel of claim 8, wherein the foam component includes a corner edge located at an intersection of two of the foam component side faces, and further comprising edge guard extensions covering the corner edge.

18. The cargo restraint panel of claim 17, wherein one of the edge guard extensions projects from two of the front edge guards, and wherein another of the edge guard extensions projects from two of the rear edge guards.

19. The cargo restraint panel of claim 18, wherein the edge guard extensions overlap.

20. The cargo restraint panel of claim 19, wherein the edge guard extensions are not bonded to one another.

21. The cargo restraint panel of claim 8, wherein the foam component includes multiple corner edges, each of the corner edges located at an intersection of a different two of the foam component side faces, and further comprising multiple pairs of edge guard extensions, each of the pairs of edge guard extensions corresponding to and covering a different one of the corner edges.

22. The cargo restraint panel of claim 21, wherein each of the pairs of edge guard extensions comprises a first edge guard extension extending from two of the front edge guards and a second edge guard extension extending from two of the rear edge guards, and wherein, as to each of the pairs of edge guard extensions, the first and second edge guard extensions overlap.

* * * * *